United States Patent [19]
Saito

[11] Patent Number: 5,890,791
[45] Date of Patent: *Apr. 6, 1999

[54] LIGHT CONTROL SHEET, SURFACE LIGHT SOURCE UNIT AND LIQUID CRYSTAL DISPLAY DEVICE

[75] Inventor: Shinichiro Saito, Hachioji, Japan

[73] Assignee: Konica Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 731,021

[22] Filed: Oct. 9, 1996

[30] Foreign Application Priority Data

Oct. 13, 1995 [JP] Japan .................................. 7-265530

[51] Int. Cl.$^6$ ...................................................... F21V 8/00

[52] U.S. Cl. ............................ 362/31; 362/330; 362/339; 385/146

[58] Field of Search .......................... 349/62–66; 362/26, 362/31, 330, 337, 339; 385/146

[56] References Cited

U.S. PATENT DOCUMENTS

| 3,716,710 | 2/1973 | Clostermann et al. | 362/330 |
| 5,032,963 | 7/1991 | Granstrom | 362/337 |
| 5,303,322 | 4/1994 | Winston et al. | 385/146 |
| 5,506,929 | 4/1996 | Tai et al. | 385/146 |

FOREIGN PATENT DOCUMENTS

WO94/06051  3/1994  WIPO .................................... 349/65

*Primary Examiner*—Alan Cariaso
*Attorney, Agent, or Firm*—Finnegan, Henderson, Farabow, Garrett & Dunner, L.L.P

[57] ABSTRACT

A light control sheet for receiving a light incident on one surface thereof and for emitting the received light from the other surface thereof, includes plural prisms which is provided at least one of surfaces of the sheet. Each of the prisms has a generatrix in parallel to each other, and has two side surfaces formed on both sides with respect to a plane surface which includes the generatrix and is perpendicular to the light control sheet. The two side surfaces have asymmetrical shapes each other with respect to the plane surface, and at least one of the two side surfaces is nonplanar.

19 Claims, 24 Drawing Sheets

LIGHT CONTROL SHEET, SURFACE LIGHT SOURCE UNIT AND LIQUID CRYSTAL DISPLAY DEVICE

BACKGROUND OF THE INVENTION

The present invention relates to a light control sheet wherein a plurality of prisms are formed on at least one side of the sheet in a manner that generatrices forming the prisms are in parallel each other so that an incident light entering the light control sheet through the prism-formation side of the light control sheet emerges out of the other side thereof, and it relates also to a surface light source unit and a liquid crystal display device both employing the light control sheet.

Next, an example of a conventional light control sheet will be explained as follows, referring to drawings. FIG. 19 is a diagram showing how a liquid crystal display device employing a conventional light control sheet is structured, and FIG. 20 is an enlarged section of the light control sheet shown in FIG. 19.

In the drawing, the numeral 1 represents a cold-cathode tube, and 2 represents a light-guiding plate wherein prism projection 2b is formed on transmission surface 2a so that light emitted from the cold-cathode tube may emerge obliquely to light control sheet 3.

The light control sheet 3 makes light emerged from the transmission surface 2a to be emerged almost perpendicular to the surface of the light control sheet, to illuminate liquid crystal display element 4.

With regard to the light control sheet 3, in this case, a plurality of prisms of the same shape 3a are formed on surface (incident surface) 3d which faces the light-guiding plate 2 in a manner that generatrices are in parallel each other as shown in FIG. 20. Further, a shape on the section of each prism 3a viewed in the direction that is in parallel with its generatrix is an equilateral triangle.

Namely, in prism 3a, a length of boundary surface at light source side 3b through which light coming from light-guiding plate 2 enters is the same as a length of boundary surface on the side opposite to a light source 3c totally reflecting light toward liquid crystal display element 4.

In a liquid crystal display device structured in the aforesaid manner, light emitted from light source 1 enters light-guiding plate 2, then, is guided through the light-guiding plate 2, and emerges out of the light-guiding plate through its transmission surface 2a. Then, the light enters through boundary surface at the light source side 3b of prism 3a on light-converging sheet 3, and a part of the light directly emerges out of emergent surface 3e and the other part thereof is reflected on boundary surface on the side opposite to a light source 3c and both of them emerge out of emergent surface 3e, to illuminate liquid crystal display element 4.

FIG. 22 shows an example of light distribution on emergent surface 3e indicated when light having characteristics shown in FIG. 21 enters an incident surface of the light control sheet 3. Incidentally, specifications of the light control sheet 3 used for the present conventional example are as follows.

Material . . . Polycarbonate (refractive index n=1.59)

Vertical angle ($\theta 1$) of boundary surface at light source side 3b of prism 3a=34°

Vertical angle ($\theta 2$) of boundary surface on the side opposite to a light source 3c of prism 3a=34°

Both boundary surface at light source side 3b and boundary surface on the side opposite to a light source 3c are shown on the expression wherein coordinate axes are established so that an origin of the coordinate passes through a vertex of the prism 3a and generatrices of the prism 3a are perpendicular to X-Y plane, as shown in FIG. 20.

Boundary surface at light source side 3b . . . Y=−1.540X (−0.649 mm≦X≦0 mm)

Boundary surface on the side opposite to a light source 3c . . . Y=1.540X (0≦X≦0.649 mm)

On the light control sheet 3 of the present conventional example, the maximum luminance was 2278 (cd/m$^2$) and a half-value degree (angular range having the luminance that is more than a half of the maximum luminance) was 25.63°.

An optical system of the light control sheet 3 mentioned above will be explained as follows, referring to FIGS. 23(a) and 23(b). FIG. 23(a) is a diagram explaining an optical system wherein light shown in FIG. 21 enters light control sheet 3 shown in FIG. 20, while FIG. 23(b) is a diagram on which the optical system shown in FIG. 23(a) is developed.

FIG. 23(b) shows an optical system wherein light enters a slanted transparent plate and then emerges from it. In the case of this type of optical system, when an inclination angle is changed, an angle of emergence from emergent surface 3e only changes. Namely, a graphical shape of light distribution characteristics as shown in FIG. 22 is only subjected to parallel displacement in the direction of an axis of the angle of emergence, and the shape itself can not be controlled.

On the other hand, FIG. 23(a) is equivalent to FIG. 23(b) wherein light enters a slanted transparent plate and emerges from it. Therefore, even when vertical angles ($\theta 1$, $\theta 2$) of prism 3a corresponding to a slanted angle are changed, a graphical shape itself can not be controlled though an angle of emergence only changes. Namely, neither the maximum luminance nor the half-value degree can be controlled, and further, side lobe light (undesired light that usually does not enter an eye of a liquid crystal observer) can not be controlled either, which is a problem.

When light emerging from light control sheet 3 is highly directive under the condition that an amount of light emerging from light control sheet 3 is constant independently of a distance from a light source, especially when the emergence luminance in the +10° direction falls rapidly under the condition that light which emerges in the direction to the front (0° direction) is intense, there is a possibility that a liquid crystal observer observes an occurrence of luminance unevenness.

For example, when a liquid crystal image plane in A4 size is observed from the point which is away from the image plane by about 500 mm and is perpendicular to the image plane at its center, an edge of the image plane is inclined by about 10°.

FIG. 24 is a diagram showing light distribution characteristics of a light control sheet and luminance unevenness that is caused by the change of an apparent angle to a liquid crystal observer.

Therefore, it is efficient when a peak of emergence is directed to a liquid crystal observer at various points on an image plane instead of directing the peak of emergence to the 0° direction all together on the entire image plane.

SUMMARY OF THE INVENTION

The present invention has been achieved in view of the problems mentioned above, and its first object is to provide a light control sheet capable of controlling the maximum luminance, a half-value degree and a side lobe light, a surface light source unit and a liquid crystal display device.

The second object is to provide a light control sheet that is free from luminance unevenness.

A light control sheet of the invention for solving the problems mentioned above is represented by a light control sheet having on at least one side of the sheet a plurality of prisms formed in a manner that generatrices forming the prisms are in parallel each other so that an incident light entering the light control sheet through the prism-formation side of the sheet emerges out of the other side thereof, wherein each of the aforesaid prisms has, when viewed in the direction that is in parallel with the generatrices, two boundary surfaces which meet at a vertex of the prism and are asymmetric about a straight line which passes through the vertex of the prism and is perpendicular to the sheet surface, and at least one of the two boundary surfaces is nonplanar.

Due to an arrangement that at least one of two boundary surfaces is made to be nonplanar, when a shape of the nonplanar surface is changed, a graphical shape of luminance of light emerging from a light control sheet can be changed, and thereby it is possible to control a maximum luminance, a half-value degree and a side lobe light so that they may meet the specifications of a liquid crystal display device.

As a preferable example, there is one wherein a sectional shape of the prism is made to be almost a triangle having the first and second boundary surfaces and at least one of these two boundary surfaces is made to be a curved surface, and there further is one wherein the prism is formed on each of both sides of an incident light.

In an example which is further preferable, an incident light to one side of a sheet is a directive light having a peak of luminance in the direction inclined against the sheet surface, and aforesaid first boundary surface is a plane for guiding aforesaid light to the inside of the prism, while, aforesaid second boundary surface is a plane for reflecting the light guided through the first boundary surface toward a surface on the other side of the sheet.

Constitution of the prism such as one mentioned above includes the following.
(1) Aforesaid first boundary surface of the prism is a plane surface and aforesaid second boundary surface thereof is a curved surface that is convex.
(2) Aforesaid first boundary surface of the prism is a plane surface and aforesaid second boundary surface thereof is a curved surface that is concave.
(3) Aforesaid first boundary surface of the prism is a curved surface that is convex and aforesaid second boundary surface is a plane surface.
(4) Aforesaid first boundary surface of the prism is a curved surface that is concave and aforesaid second boundary surface thereof is a plane surface.
(5) One of the first and second boundary surfaces of the prism is a curved surface that is convex while the other is a curved surface that is concave.
(6) Both of the first and second boundary surfaces of the prism represent a curved surface that is convex.
(7) Both of the first and second boundary surfaces of the prism represent a curved surface that is concave.

Further, for eliminating luminance unevenness when viewed from an observer, it is preferable to change a shape of the section of the prism so that an intensity peak of light entering the sheet may be inclined against the sheet plane, and light emerging from the sheet may pass through the center portion of the sheet and may cross a plane that is in parallel with generatrices of the prism and is perpendicular to the sheet surface.

A surface light source unit of the invention is represented by a surface light source unit composed of a light source, a light-guiding plate that guides light emitted from the light source and makes it to emerge in the prescribed direction, and a light control sheet in which a plurality of prisms are formed on at least one side of the sheet in a manner that generatrices forming the prisms are in parallel each other and light coming from the light-guiding plate is made to enter one side of the sheet and to emerge from the other side of the sheet, wherein each of the aforesaid prisms of the light control sheet has, when viewed in the direction that is in parallel with the generatrices, two boundary surfaces which meet at a vertex of the prism and are asymmetric about a straight line which passes through the vertex of the prism and is perpendicular to the sheet surface, and at least one of the two boundary surfaces is nonplanar.

Due to an arrangement that at least one of two boundary surfaces is made to be nonplanar, when a shape of the nonplanar surface is changed, a graphical shape of luminance of light emerging from a light control sheet can be changed, and thereby it is possible to control a maximum luminance, a half-value degree and a side lobe light so that they may meet the specifications of a liquid crystal display device.

A liquid crystal display device of the invention is represented by a liquid crystal display device composed of a light source, a light-guiding plate that guides light emitted from the light source and makes it to emerge in the prescribed direction, a light control sheet in which a plurality of prisms are formed on at least one side of the sheet in a manner that generatrices forming the prisms are in parallel each other and light coming from the light-guiding plate is made to enter one side of the sheet and to emerge from the other side of the sheet, and liquid crystal display elements provided at both sides on the other side of the light control sheet, wherein each of the aforesaid prisms of the light control sheet has, when viewed in the direction that is in parallel with the generatrices, two boundary surfaces which meet at a vertex of the prism and are asymmetric about a straight line which passes through the vertex of the prism and is perpendicular to the sheet surface, and at least one of the two boundary surfaces is nonplanar.

Due to an arrangement that at least one of two boundary surfaces is made to be nonplanar, when a shape of the nonplanar surface is changed, a graphical shape of luminance of light emerging from a light control sheet can be changed, and thereby it is possible to control a maximum luminance, a half-value degree and a side lobe light.

It is preferable to provide a diffusion sheet between a light-guiding plate and a light control sheet so that an image plane of a liquid crystal element may be illuminated uniformly in terms of luminance.

Further, for the purpose of preventing a moire caused by a light-guiding plate and a light control sheet, it is possible to provide the light control sheet on the surface of the liquid crystal display element that is opposite to its surface facing the light-guiding plate.

BRIEF DESCRIPTION OF THE DRAWINGS

FIG. 12 is a diagram in which FIGS. 4, 5 and 22 are summarized.

FIG. 13 is a diagram in which FIGS. 6, 7 and 22 are summarized.

FIG. 14 is a diagram in which FIGS. 8, 9 and 22 are summarized.

FIG. 15 is a diagram in which FIGS. 10, 11 and 22 are summarized.

FIG. 22 is a diagram showing an example of light distribution characteristics observed on the surface of emergence when the light having characteristics shown in FIG. 21 enters a light control sheet shown in FIG. 19.

DETAILED DESCRIPTION OF THE INVENTION

Figure 1:
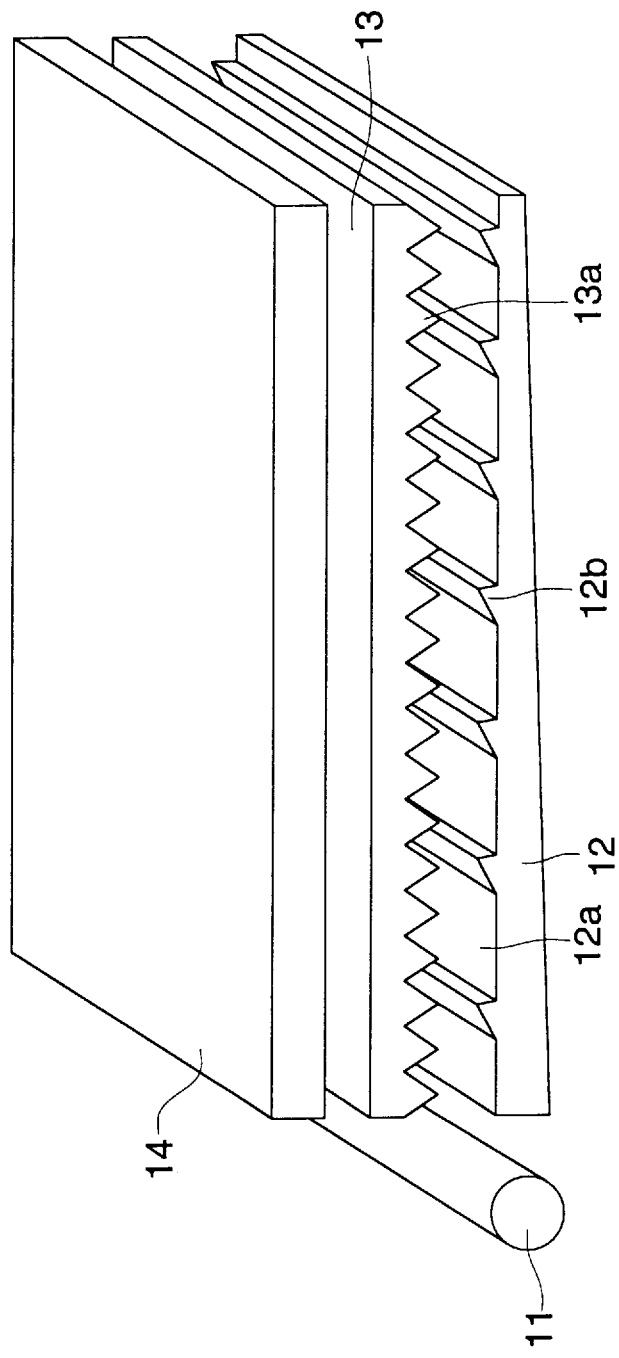
FIG. 1 is a diagram showing the structure of a liquid crystal display device that is an example of the invention.
Figure 2:
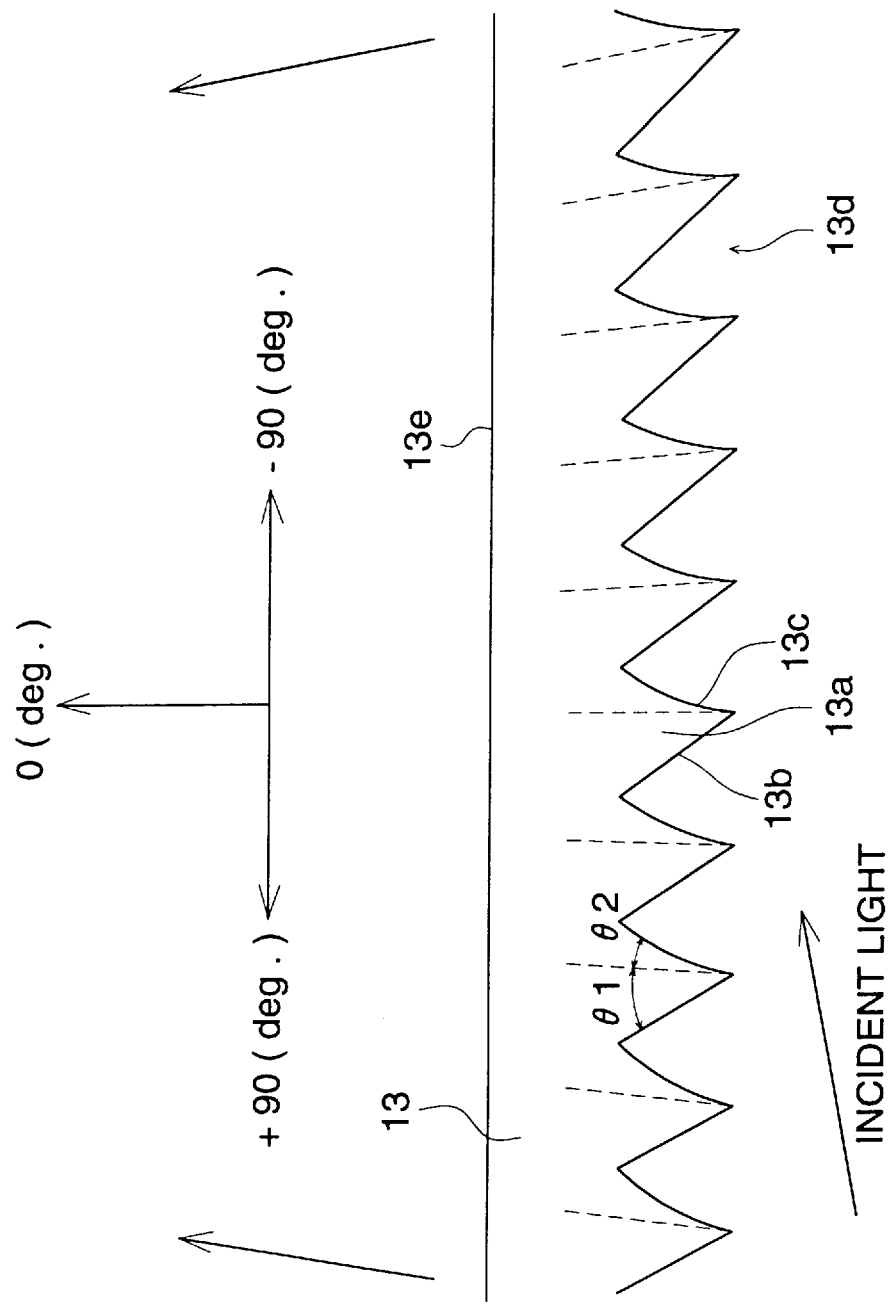
FIG. 2 is an enlarged section of a light control sheet shown in FIG. 1.

Structure of an example of the invention will be explained as follows, referring to the drawings. FIG. 1 is a diagram showing the structure of a liquid crystal display device that is an example of the invention, and FIG. 2 is an enlarged section of a light control sheet shown in FIG. 1.

In the drawing, the numeral 11 represents a cold-cathode tube which is a light source, and 12 is a light-guiding plate wherein prism projection 12b is formed on transmission surface 12a so that light emitted from the cold-cathode tube 11 may emerge obliquely toward light control sheet 13.

On the transmission surface 12a of the light-guiding plate 12, there is provided light control sheet 13 which makes light emerging from the transmission surface 12a of the light-guiding plate 12 to emerge in the prescribed direction.

These items including the cold-cathode tube 11, the light-guiding plate 12 and the light control sheet 13 constitute a surface light source unit that illuminates liquid crystal display element 14.

With regard to the light control sheet, in this case, a plurality of prisms 13a are formed on the surface (incident surface) 13d that faces the light-guiding plate 2, in a manner that generatrices are in parallel each other as shown in FIG. 2.

Each of prisms 13a in the example of the invention is almost a triangle in shape which is asymmetric about a plane perpendicular to the light control sheet 13 when viewed in the direction parallel with generatrices forming the prism 13a, and boundary surface 13b positioned at the light source side is a plane surface and boundary surface 13c on the side opposite to a light source is a curved surface which is concave.

Light control sheet 13 in the example of the invention is manufactured through a method of molding by means of a metallic mold in which polycarbonates or acrylic resins are used, or through a method for forming a prism on a transparent base board using UV-hardening resin composition disclosed in Japanese Patent Publication Open to Public Inspection No. 174911/1995 (hereinafter referred to as Japanese Patent O.P.I. Publication).

Further, a form of the section of each prism 13a is established to take a shape which makes the light emerging from light control sheet 13 to pass through the center portion of the light control sheet 13 and to intersect a plane which is in parallel with generatrices of the prism 13 and is perpendicular to the light control sheet plane.

In a liquid crystal display device structured in the aforesaid manner, light emerging from light source 11 enters light-guiding plate 12, then, is guided through the light-guiding plate 12, and emerges out through its transmission surface 12a. Then, the light enters through boundary surface at light source side 13b of prism 13a on light-converging sheet 13, and a part of the light directly emerges out of emergent surface 13e and the other part thereof is reflected on boundary surface on the side opposite to a light source 13c and emerges out of emergent surface 13e, both to illuminate liquid crystal display element 14.

Incidentally, a difference between prism 13a of light control sheet 13 in the example of the invention and a prism of a Fresnel lens lies in that a boundary surface at only one side of a Fresnel lens prism is used, while, light enters boundary surface 13b at the light source side and boundary surface 13c on the side opposite to a light source reflects light in the prism 13a in the example of the invention, resulting in a difference between them in terms of optical actions.

Figure 23:
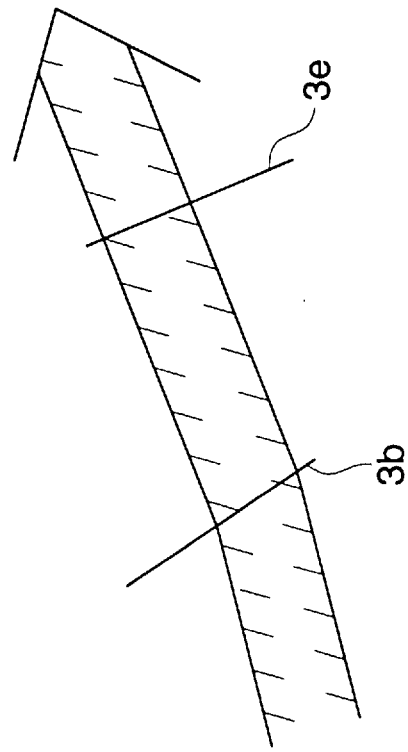
FIGS. 23(a) and 23(b) represent a diagram explaining an optical system of the light control sheet shown in FIG. 19.
Figure 23:
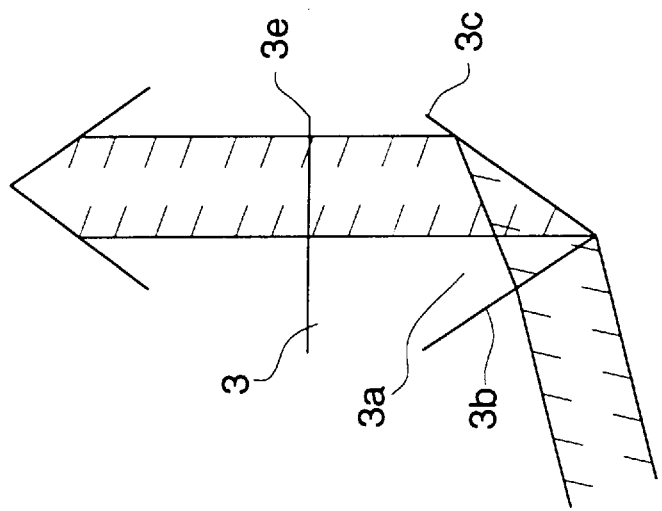
Figure 24:
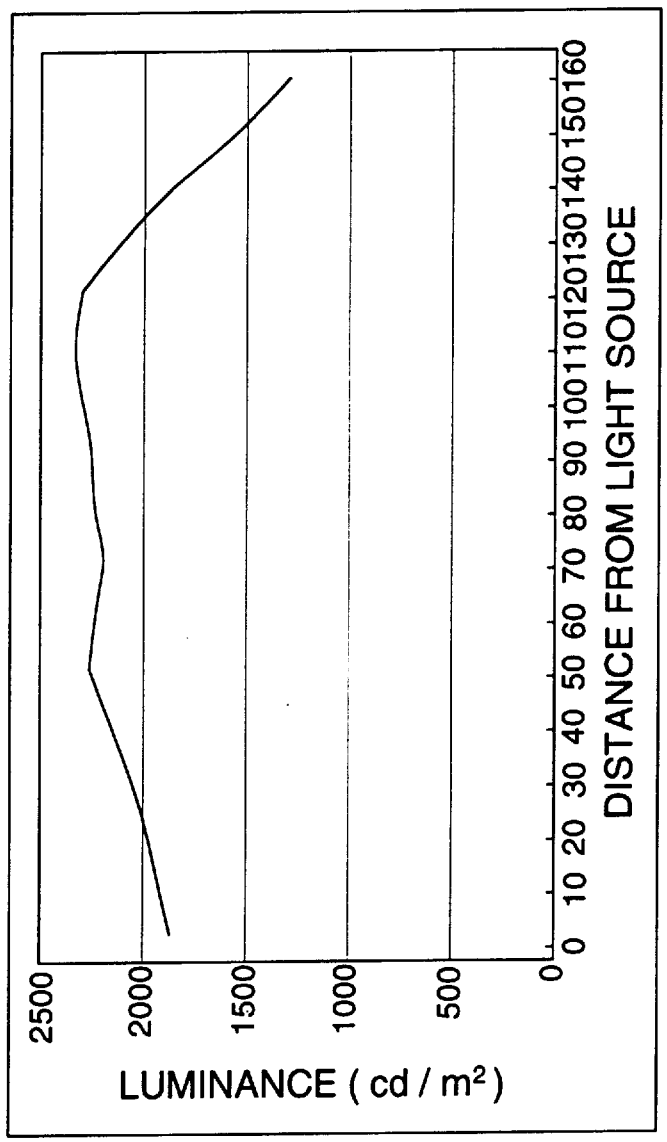
FIG. 24 is a diagram explaining the relation between a luminance of light emerging from the light control sheet shown in FIG. 19 and a distance from a light source.

The light control sheet 13 structured in aforesaid manner is equivalent to the occasion where an incident surface of a slanted transparent plate shown in FIG. 23(b) is a curved surface which is concave, and when this curved surface is changed, light distribution characteristics of emergent light, namely, a maximum luminance, a half-value degree and a side lobe are changed. Even in aforesaid constitution, therefore, it is possible to change light distribution characteristics of an emergent light by making the boundary surface 13c on the side opposite to a light source of prism 13a on the light control sheet 13 to be a concave curved surface.

Further, due to an arrangement wherein a sectional form of each prism 13a is established to take a shape which makes the light emerging from light control sheet 13 to pass through the center portion of the light control sheet 13 and to intersect a plane which is in parallel with generatrices of the prism 13 and is perpendicular to the light control sheet plane, a luminance peak of light emerging from emergent surface 13e of the light control sheet 13 moves from the minus direction to the plus direction as a distance from light source 11 increases, and the peak of light is concentrated to an eye of an observer looking at almost the center of liquid crystal display element 14, resulting in elimination of luminance unevenness.

To be concrete, it is preferable to make an arrangement so that an angle of emergent peak of light emerging from the light control sheet 13 takes $-10\pm5°$ at the position near the light source, $\pm5°$ at the center of an image plane, and $10\pm5°$ at the position far from the light source, under consideration about a margin that is for the occasion that an eye of an observer is deviated from the center of an image plane.

Incidentally, the invention is not limited to the example mentioned above. In aforesaid example, boundary surface 13b at the light source side on the prism 13a is a plane surface and boundary surface 13c on the side opposite to a light source thereof is a concave curved surface. However, the invention is not limited to this, and the following combinations are also satisfactory.
(1) A boundary surface at the light source side on the prism is a plane surface and a boundary surface on the side opposite to a light source on the prism is a convex curved surface.
(2) A boundary surface at the light source side of the prism is a convex curved surface and a boundary surface on the side opposite to a light source thereof is a plane surface.
(3) A boundary surface at the light source side of the prism is a concave curved surface and a boundary surface on the side opposite to a light source thereof is a plane surface.
(4) One of a boundary surface at the light source side of the prism and a boundary surface on the side opposite to a light source thereof is a convex curved surface and the other is a concave curved surface.
(5) Both of a boundary surface at the light source side and a boundary surface on the side opposite to a light source represent a convex curved surface.
(6) Both of a boundary surface at the light source side and a boundary surface on the side opposite to a light source represent a concave curved surface.

Figure 3:
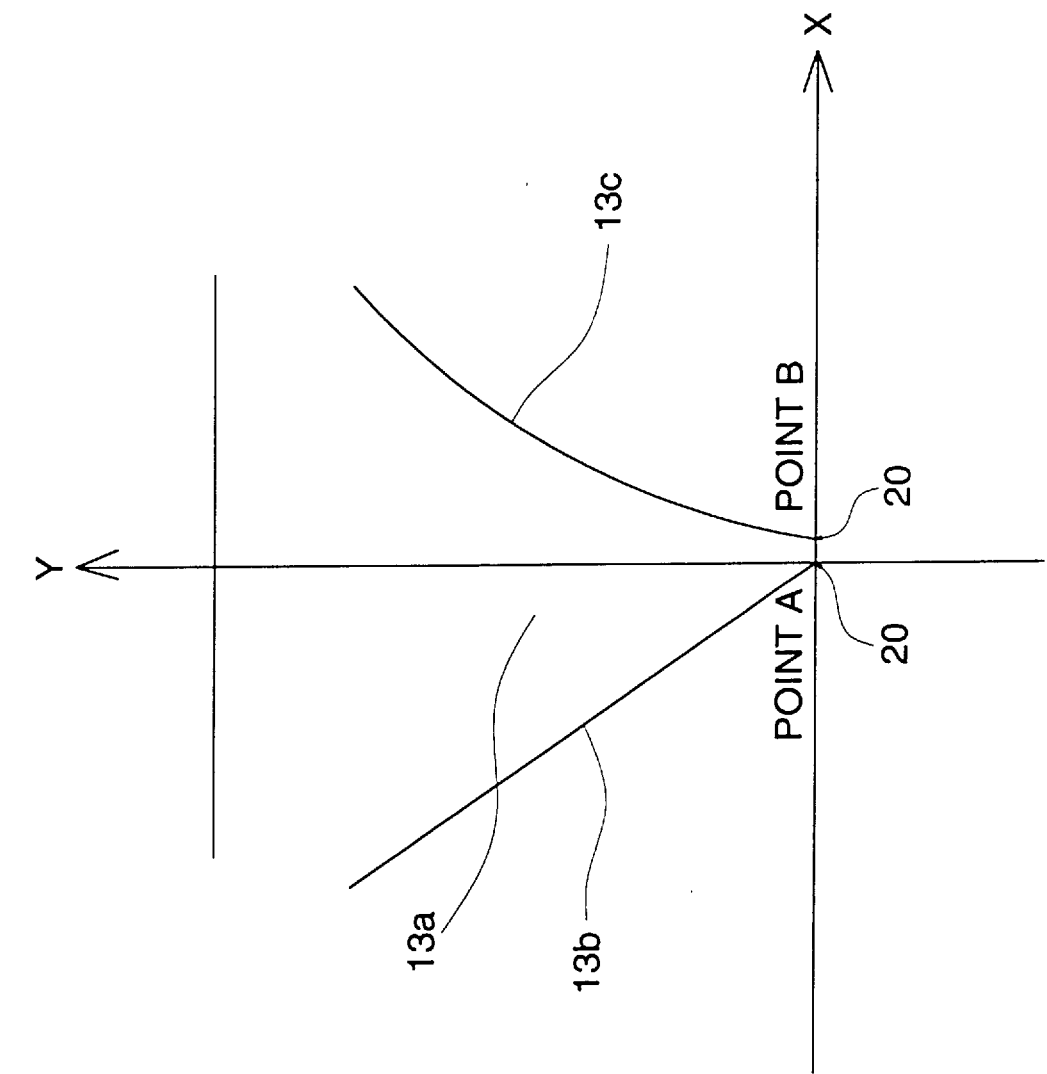
FIG. 3 is a diagram explaining a curved surface of a prism in the example.
Figure 4:
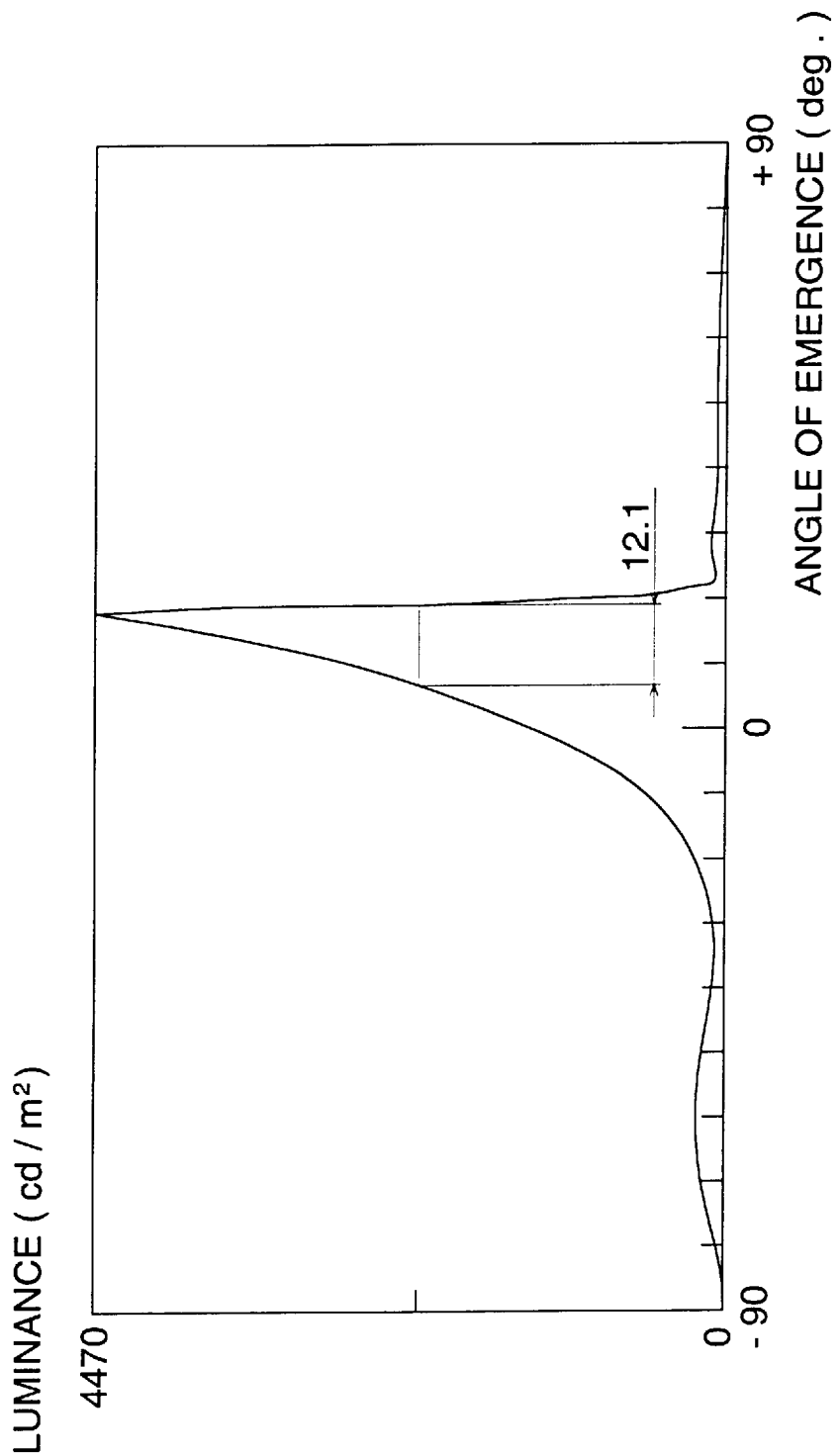
FIG. 4 is a diagram showing light distribution characteristics of an emergent light in the case where a boundary surface positioned at the light source side is a plane surface and a boundary surface on the opposite side is a curved surface (convex).
Figure 5:
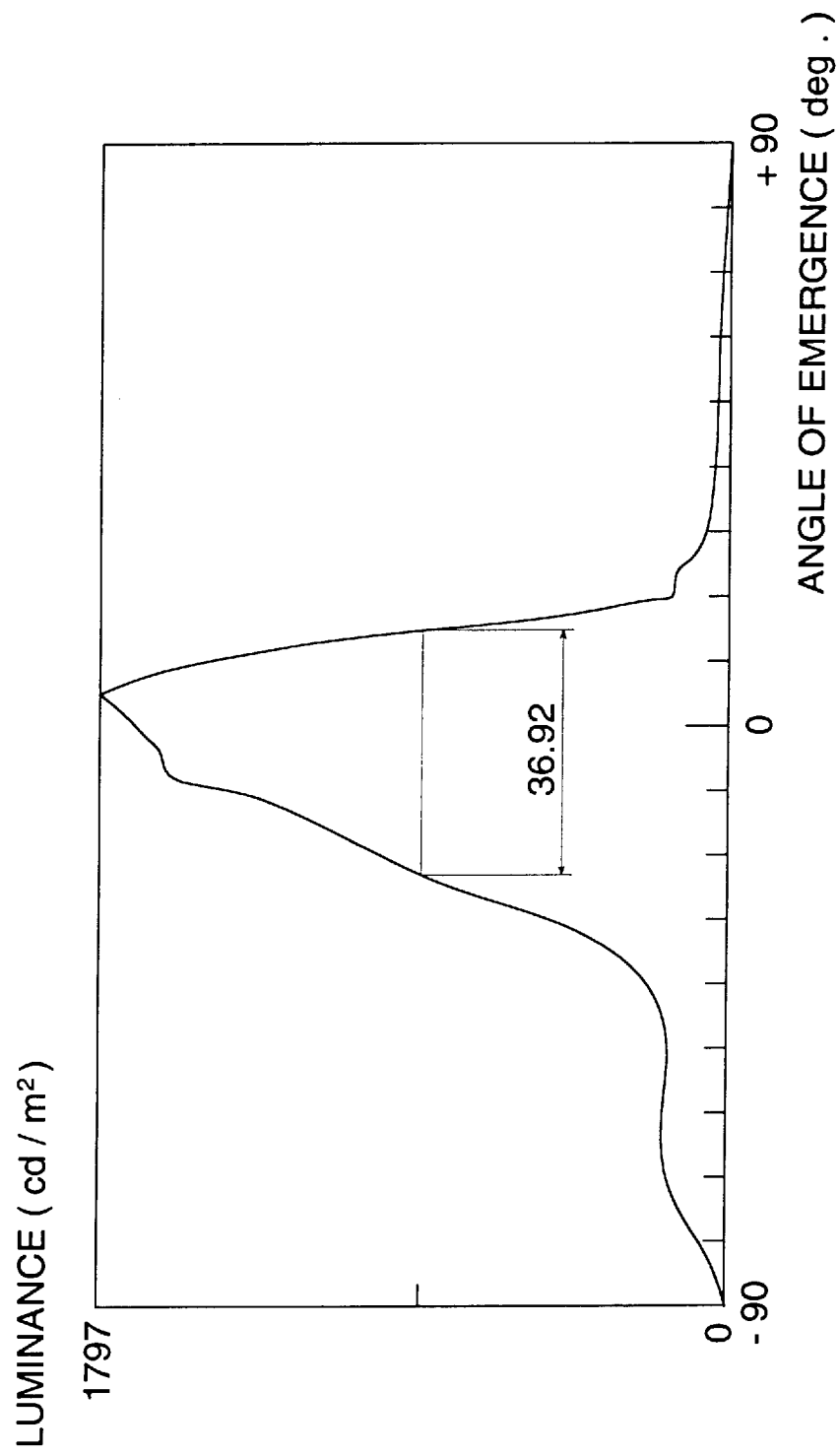
FIG. 5 is a diagram showing light distribution characteristics of an emergent light in the case where a boundary surface positioned at the light source side is a plane surface and a boundary surface on the opposite side is a curved surface (concave).
Figure 6:
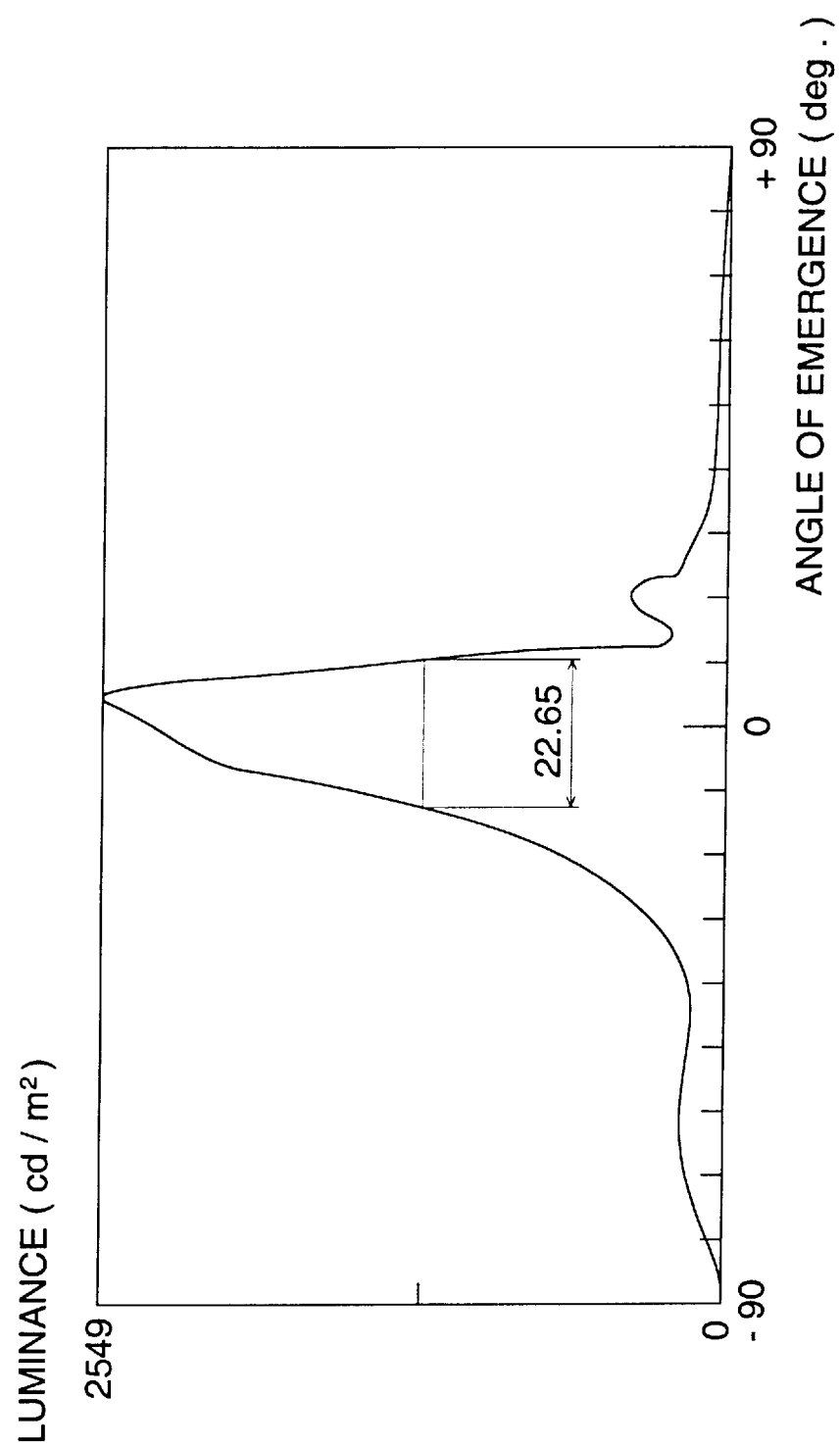
FIG. 6 is a diagram showing light distribution characteristics of an emergent light in the case where a boundary surface positioned at the light source side is a curved surface (convex) and a boundary surface on the opposite side is a plane surface.
Figure 7:
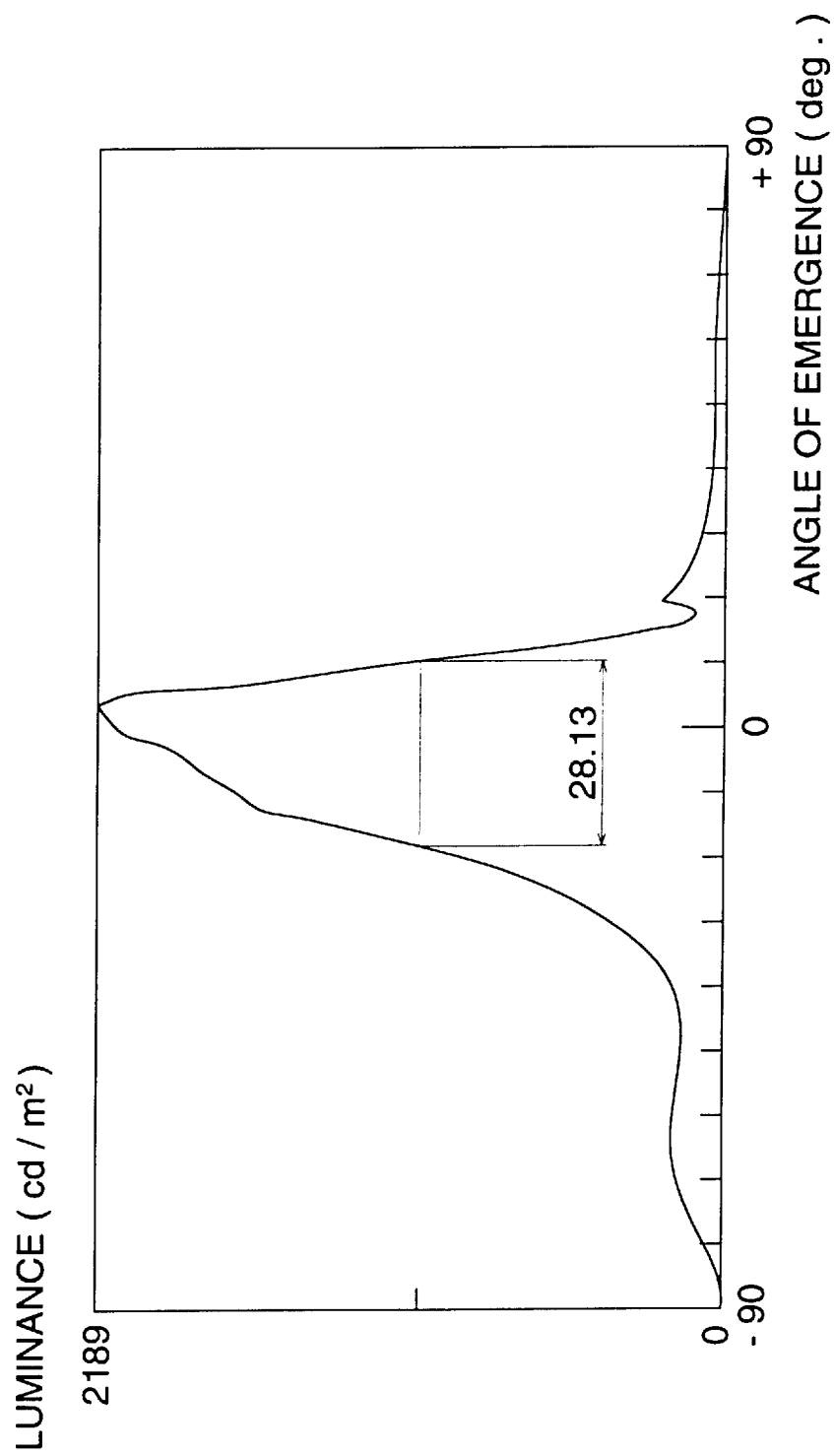
FIG. 7 is a diagram showing light distribution characteristics of an emergent light in the case where a boundary surface positioned at the light source side is a curved surface (concave) and a boundary surface on the opposite side is a plane surface.

Though a form of the section of prism 13a is mostly a triangle in the example stated above, the invention is not limited to this, and a form of the section of prism 13a which is mostly a trapezoid having a flat portion at a vertex of the prism as shown in FIG. 3 is also satisfactory provided that a length of the flat portion is shorter than a pitch of the prism 13a. In this case, when the vertex of the prism is positioned to be farthermost from the sheet surface, prism vertex 20 is represented by two points (point A and point B), and a boundary surface at the light source side is positioned on the left side of the point A, while a boundary surface on the side opposite to a light source is positioned on the right side of the point B.

In the liquid crystal display device mentioned above, a diffusion sheet may be provided between light-guiding plate 12 and light control sheet 13 so that an image plane of liquid crystal display element 14 can be illuminated uniformly in terms of luminance.

Further, it is also possible to provide light control sheet 13 on the surface of liquid crystal display element 14 opposite to its surface facing light-guiding plate 12 for the purpose of preventing a moire caused by both light-guiding plate 12 and light control sheet 13.

EXAMPLE

Inventors of the invention examined light distribution characteristics of an emergent light by changing the forms of boundary surface 13b at the light source side and boundary surface 13c on the side opposite to a light source both of light control sheet 13. The results of this examination are shown in FIGS. 4–11.

Figure 21:
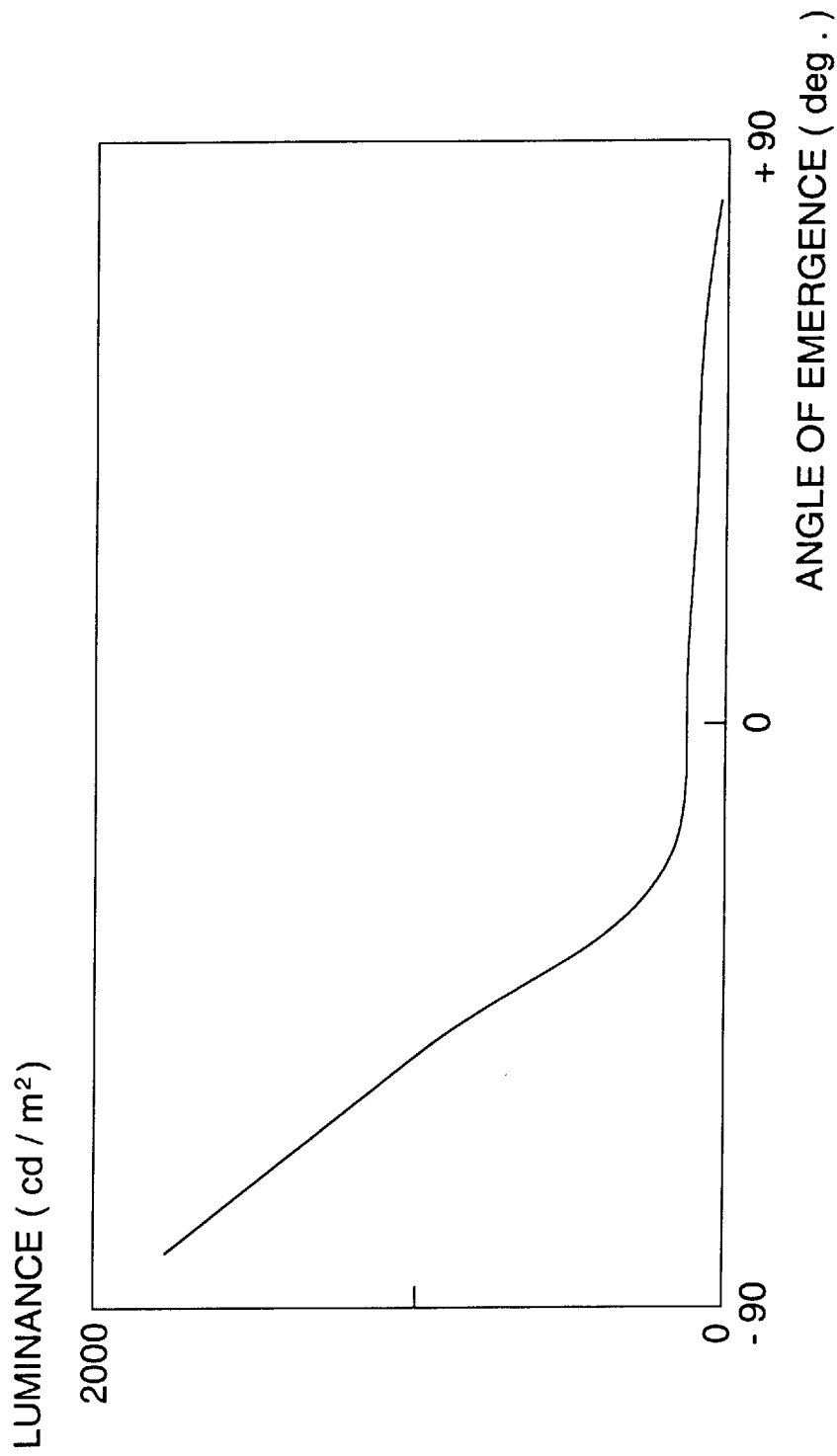
FIG. 21 is a diagram of light distribution characteristics of light entering an incident surface of the light control sheet shown in FIG. 19.
Figure 22:
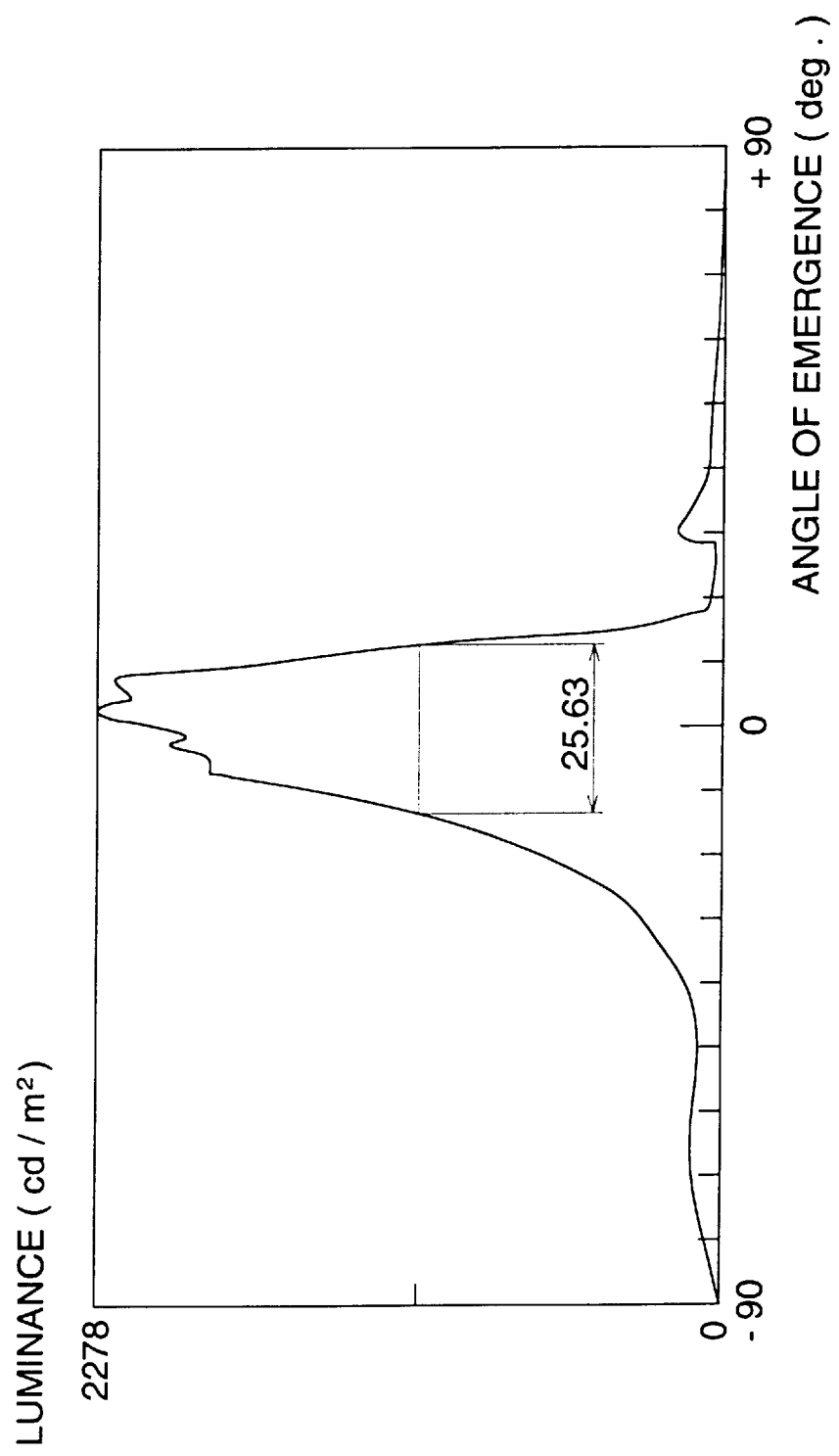

In these drawings, light entering the light control sheet 13 is the same as those in FIG. 21. Specifications of light control sheet 13 are as follows.

Material . . . Acrylic resin (refractive index n=1.492) or, polycarbonate resin (refractive index n=1.59)

Height of prism 13a . . . 1 mm

Further, a plane surface and a curved surface are represented by expressions wherein there are established X-Y axes of coordinates in which an origin passes through the vertex of prism 13a and generatrices of prism 13a are perpendicular to X-Y plane.
(1) FIG. 4
  Material . . . Acrylic resin
  Boundary surface 13b at the light source side (plane surface) $Y=-1.540X$ ($-0.649$ mm$\leq X\leq 0$ mm)
  Boundary surface 13c on the side opposite to a light source (convex) $(X+5)^2+(Y-3.247)^2=35.543$ (0 mm$\leq X\leq 0.522$ mm)
(2) FIG. 5
  Material . . . Acrylic resin
  Boundary surface 13b at the light source side (plane surface) $Y=-1.540X$ ($-0.649$ mm$\leq X\leq 0$ mm)
  Boundary surface 13c on the side opposite to a light source (concave) $(X-10)^2+(Y+6.494)^2=142.172$ (0 mm$\leq X\leq 0.726$ mm)
(3) FIG. 6
  Material . . . Acrylic resin
  Boundary surface 13b at the light source side (convex) $(X-2.675)^2+(Y-2.448)^2=13.148$ ($-0.649$ mm$\leq X\leq 0$ mm)
  Boundary surface 13c on the side opposite to a light source (plane surface) $Y=1.540X$ (0 mm$\leq X\leq 0.649$ mm)
(4) FIG. 7
  Material . . . Acrylic resin
  Boundary surface 13b at the light source side (concave) $(X+3.325)^2+(Y+1.448)^2=13.152$ ($-0.649$ mm$\leq X\leq 0$ mm)
  Boundary surface 13c on the side opposite to a light source (plane surface) $Y=1.376X$ (0 mm$\leq X\leq 0.727$ mm)

Figure 8:
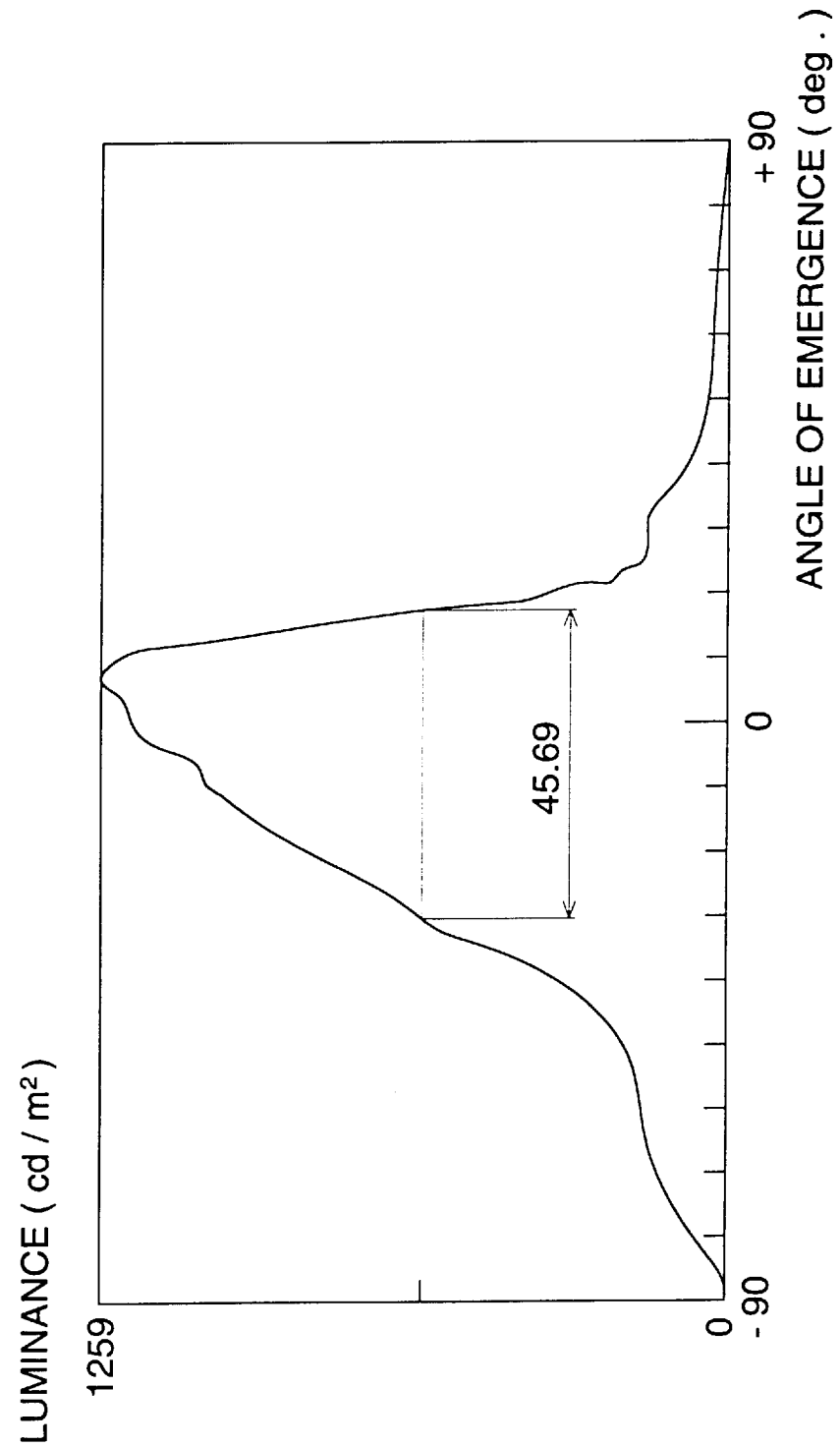
FIG. 8 is a diagram showing light distribution characteristics of an emergent light in the case where a boundary surface positioned at the light source side is a curved surface (convex) and a boundary surface on the opposite side is a curved surface (convex).
Figure 9:
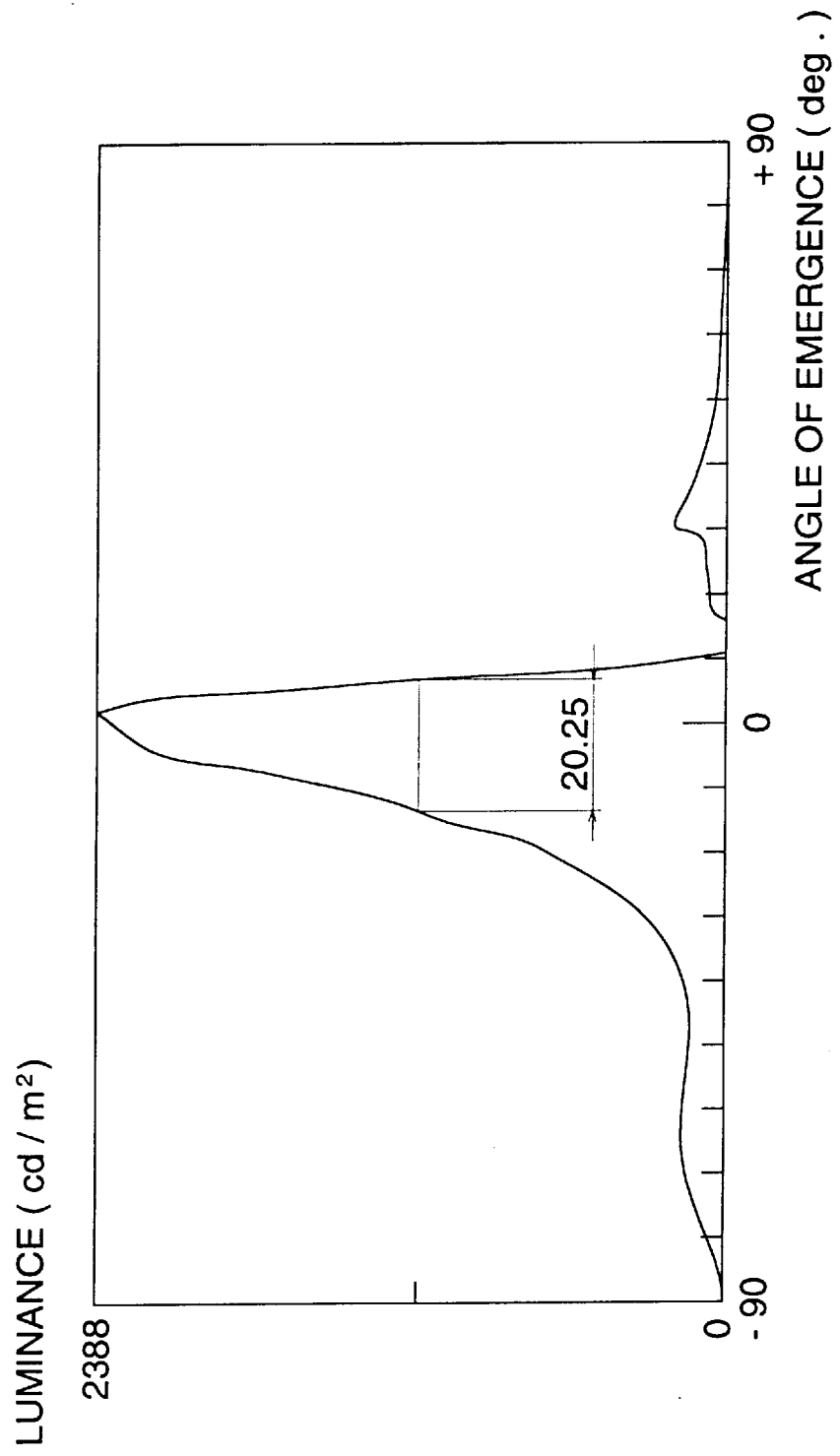
FIG. 9 is a diagram showing light distribution characteristics of an emergent light in the case where a boundary surface positioned at the light source side is a curved surface (concave) and a boundary surface on the opposite side is a curved surface (concave).
Figure 10:
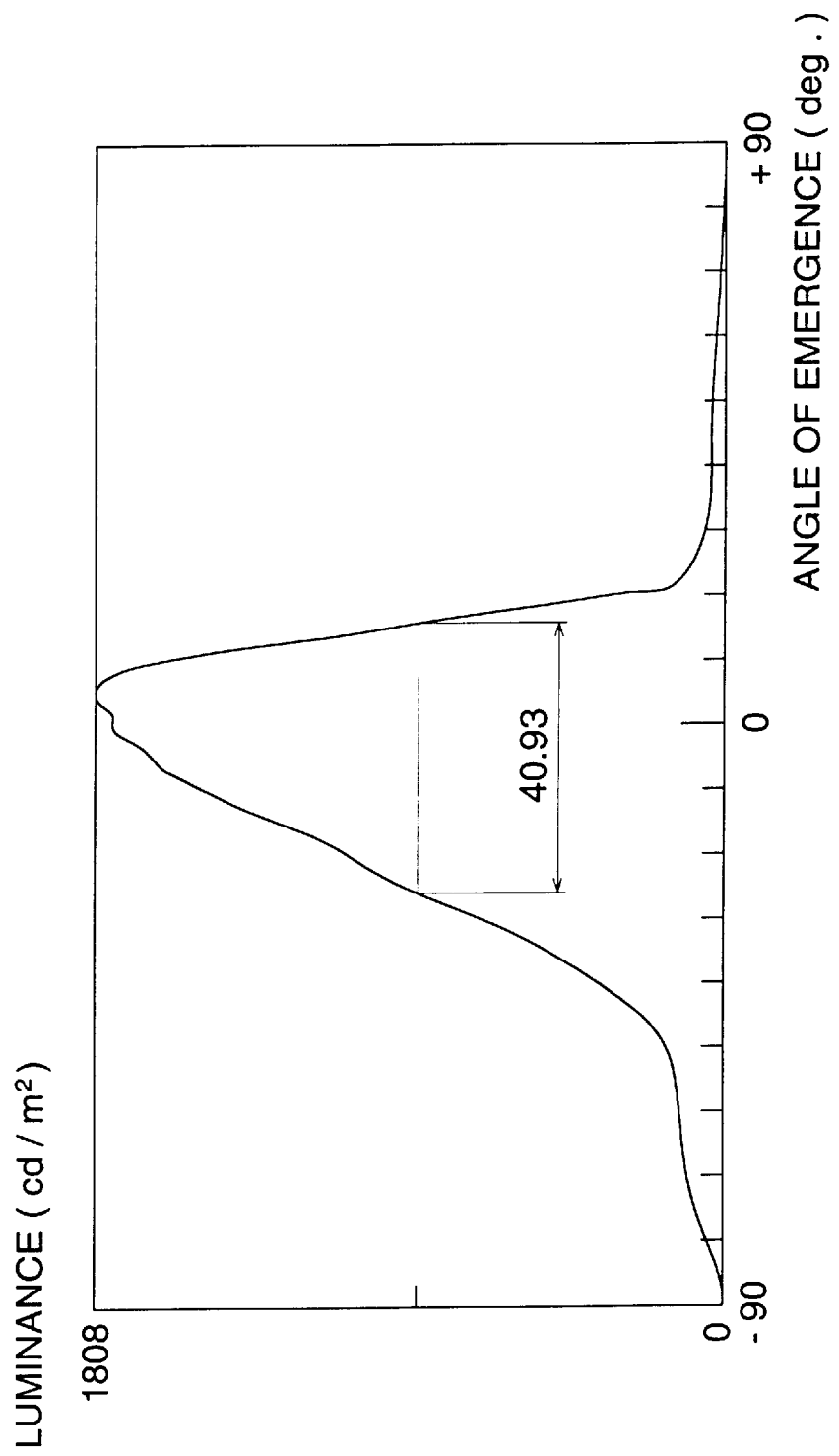
FIG. 10 is a diagram showing light distribution characteristics of an emergent light in the case where a boundary surface positioned at the light source side is a curved surface (convex) and a boundary surface on the opposite side is a curved surface (concave).
Figure 11:
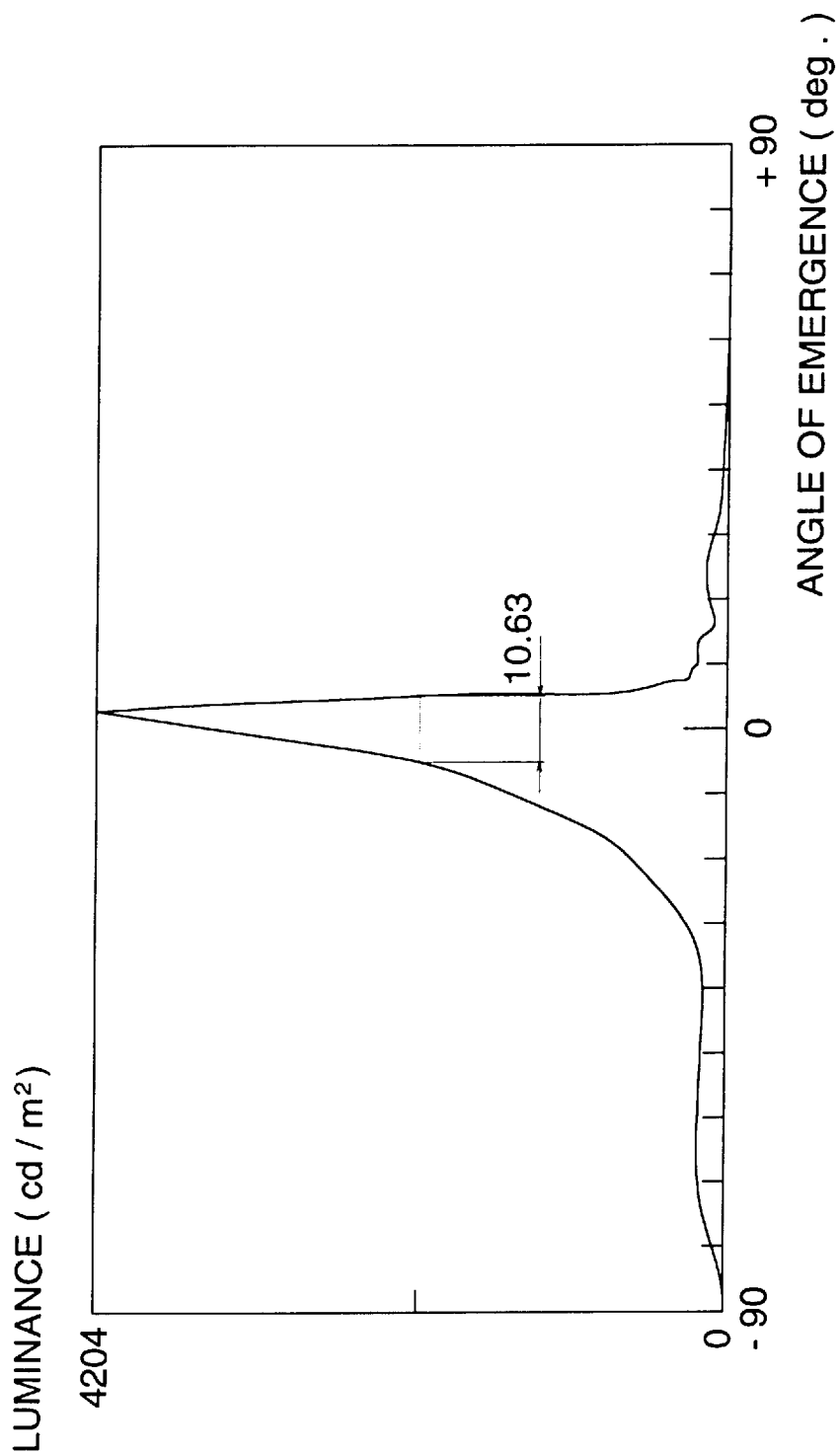
FIG. 11 is a diagram showing light distribution characteristics of an emergent light in the case where a boundary surface positioned at the light source side is a curved surface (concave) and a boundary surface on the opposite side is a curved surface (convex).
Figure 12:
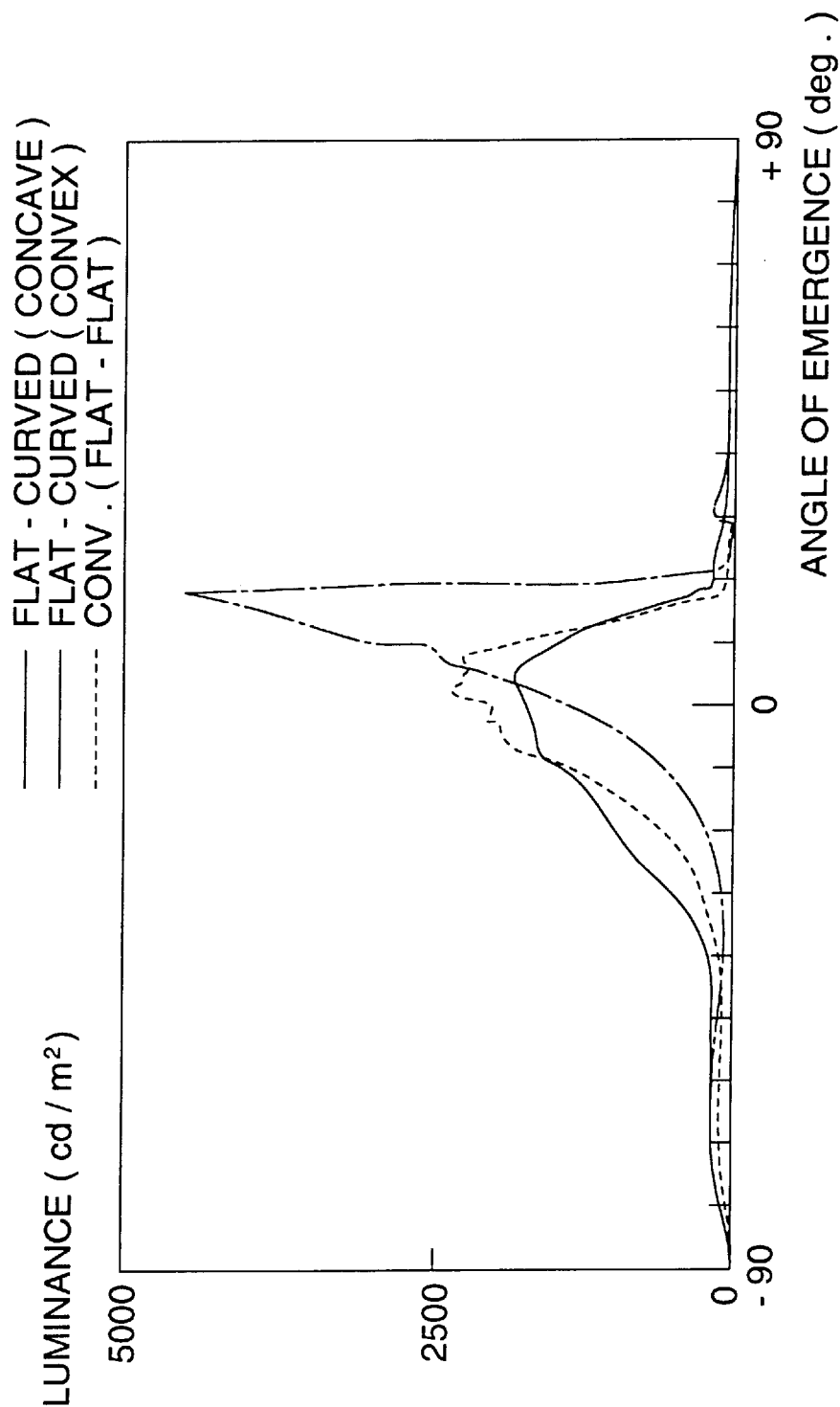
Figure 13:
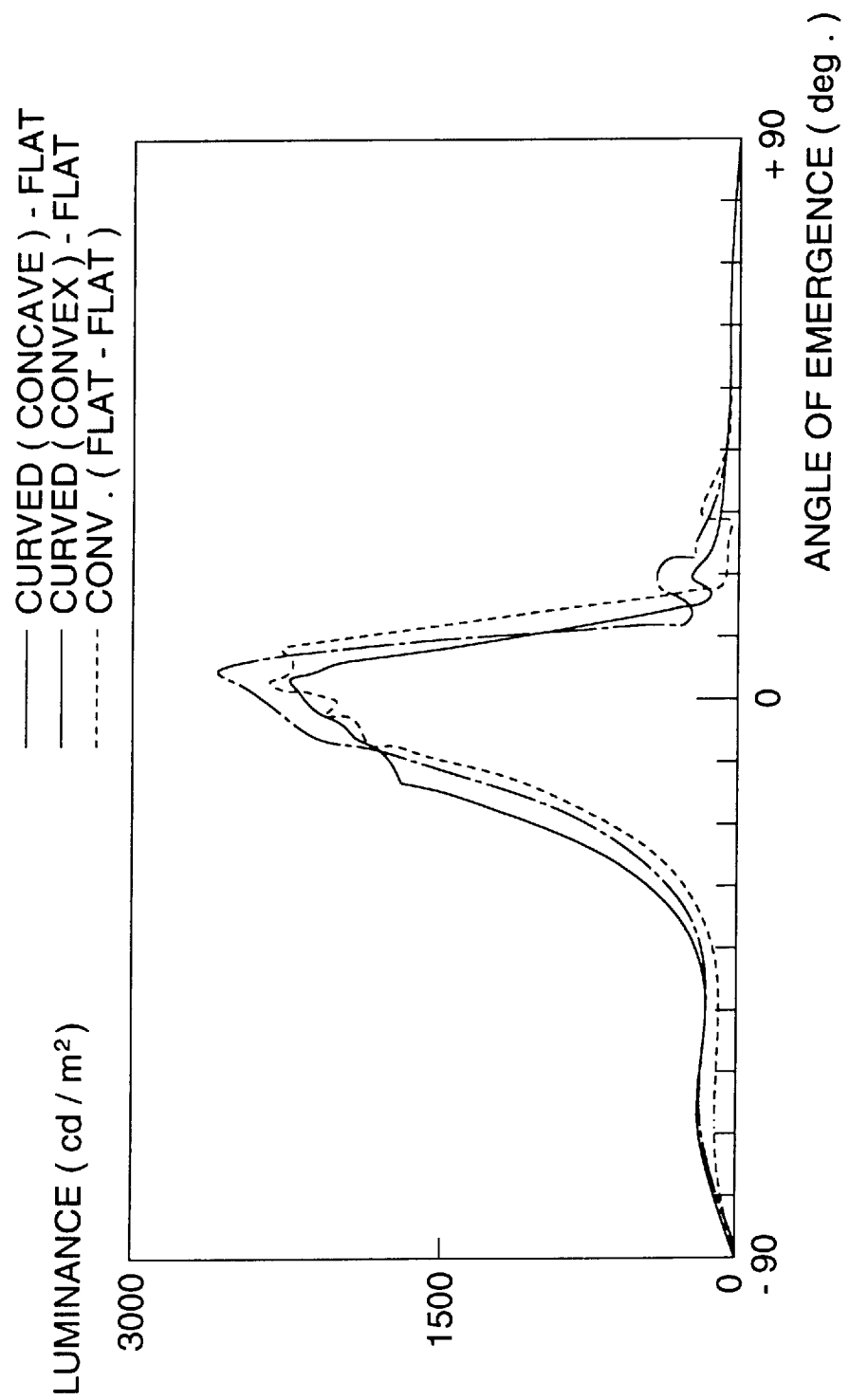
Figure 14:
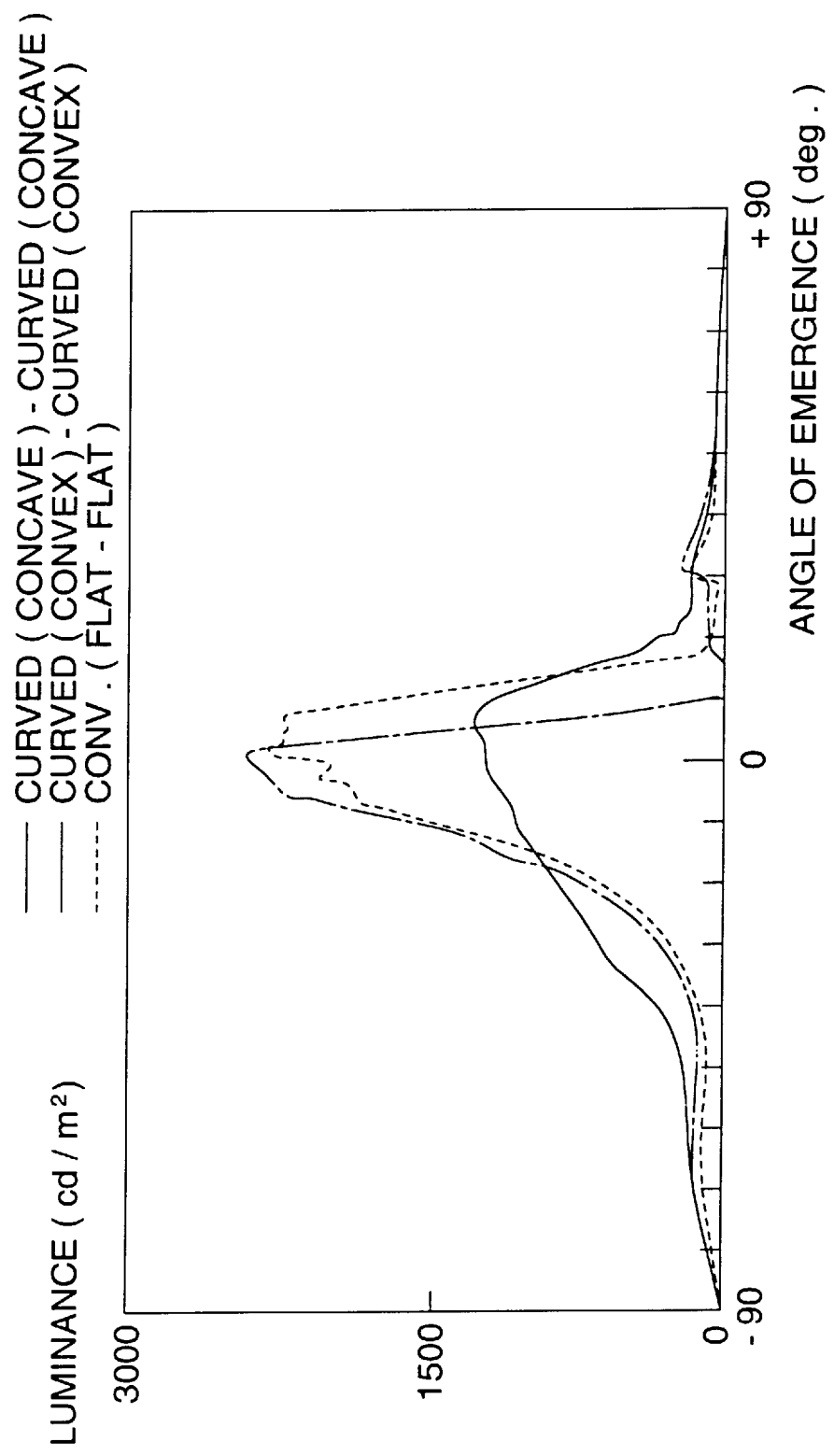

(5) FIG. 8
Material . . . Polycarbonate resin
Boundary surface 13b at the light source side (convex) $(X-80)^2+(Y-70)^2=11300$ ($-0.864$ mm$\leq X \leq 0$ mm)
Boundary surface 13c on the side opposite to a light source (convex) $(X+50)^2+(Y-33)^2=3589$ (0 mm$\leq X \leq 0.646$ mm)
(6) FIG. 9
Material . . . Polycarbonate resin
Boundary surface 13b at the light source side (concave) $(X+50)^2+(Y+40)^2=4100$ ($-0.817$ mm$\leq X \leq 0$ mm)
Boundary surface 13c on the side opposite to a light source (concave) $(X-5.84)^2+(Y+3.5)^2=46.356$ (0 mm$\leq X \leq 0.731$ mm)
(7) FIG. 10
Material . . . Acrylic resin
Boundary surface 13b at the light source side (convex) $(X-10)^2+(Y-5)^2=125$ ($-0.440$ mm$\leq X \leq 0$ mm)
Boundary surface 13c on the side opposite to a light source (concave) $(X-6)^2+(Y+4)^2=52$ (0 mm$\leq X \leq 0.804$ mm)
(8) FIG. 11
Material . . . Acrylic resin
Boundary surface 13b at the light source side (concave) $(X+9)^2+\{(Y+7)/1.1\}^2=121.496$ ($-0.717$ mm$\leq X \leq 0$ mm)
Boundary surface 13c on the side opposite to a light source (convex) $(X+6)^2+\{(Y-6.5)/1.2\}^2=65.34$ (0 mm$\leq X \leq 0.658$ mm)

Next, FIGS. 12–15 show the results of comparison between the results of the foregoing and the results of the conventional occasion where both of the boundary surfaces are plane.

Figure 15:
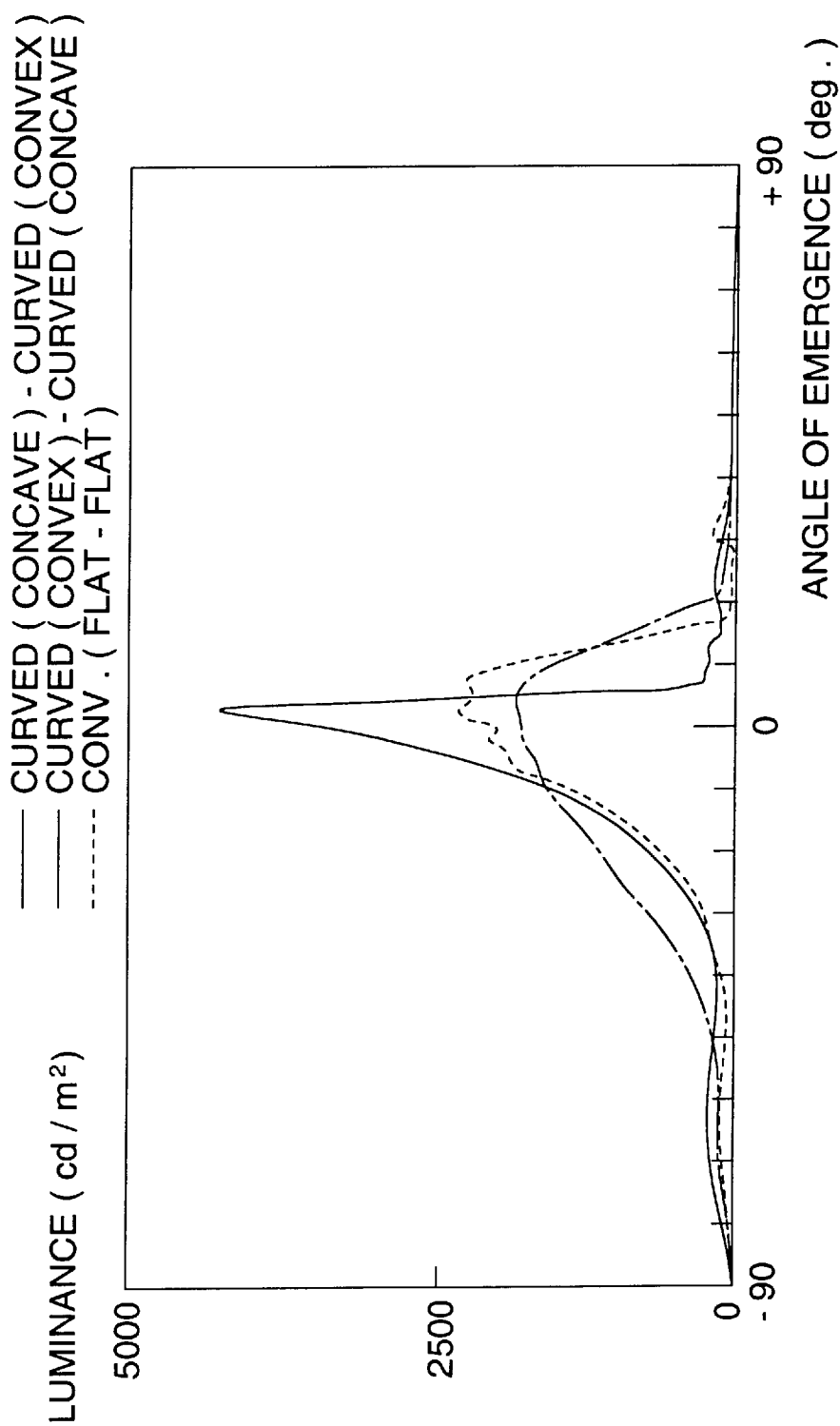

These experiments made the following items clear.
(1) When boundary surface 13c on the side opposite to a light source on the prism 13a is a convex curved surface, a half-value degree is narrowed though luminance is raised. (FIG. 12)
(2) When boundary surface 13c on the side opposite to a light source on the prism 13a is a concave curved surface, a half-value degree is increased though luminance is lowered. (FIG. 12)
(3) When boundary surface 13b at the light source side on the prism 13a is a convex curved surface, a half-value degree is narrowed though luminance is raised. (FIG. 13)
(4) When boundary surface 13b at the light source side on the prism 13a is a concave curved surface, a half-value degree is increased though luminance is lowered. (FIG. 13)
(5) When boundary surface 13b at the light source side and boundary surface 13c on the side opposite to a light source both on the prism 13a are represented by a convex curved surface, a half-value degree is increased though luminance is lowered. (FIG. 14)
(6) When boundary surface 13b at the light source side and boundary surface 13c on the side opposite to a light source both on the prism 13a are represented by a convex curved surface, a half-value degree is narrowed though luminance is raised. (FIG. 14)
(7) When boundary surface 13b at the light source side on the prism 13a is a concave curved surface and boundary surface 13c on the side opposite to a light source on the prism 13a is a convex curved surface, a half-value degree is narrowed though luminance is raised. (FIG. 15)
(8) When boundary surface 13b at the light source side on the prism 13a is a convex curved surface and boundary surface 13c on the side opposite to a light source on the prism 13a is a concave curved surface, a half-value degree is increased though luminance is lowered. (FIG. 15)

By making boundary surface 13c on the side opposite to a light source and/or boundary surface 13b at the light source side to be a curved surface as stated above, it is possible to obtain an emergent light having desired light distribution characteristics.

Figure 16:
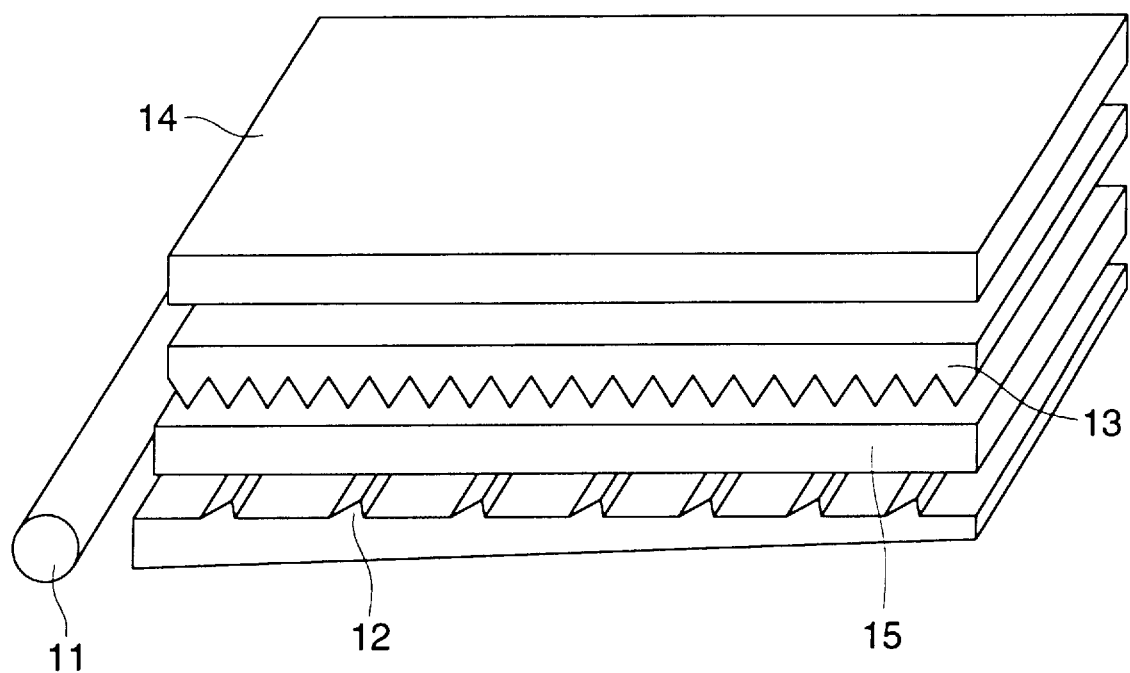
FIG. 16 is a diagram showing the structure of a liquid crystal display device in which a diffusion sheet is used.

Further, FIG. 16 shows an example wherein diffusion sheet 15 is provided between light-guiding plate 12 and light control sheet 13. It is also possible to provide diffusion sheet 15 between light control sheet and liquid crystal display element 14, though this is not illustrated.

The diffusion sheet 15 mentioned above is used for the purpose to make the light entering from light-guiding plate 12 to be luminous evenly on the surface of the light-guiding plate 12, or to make the light to emerge covering a broad range.

Figure 17:
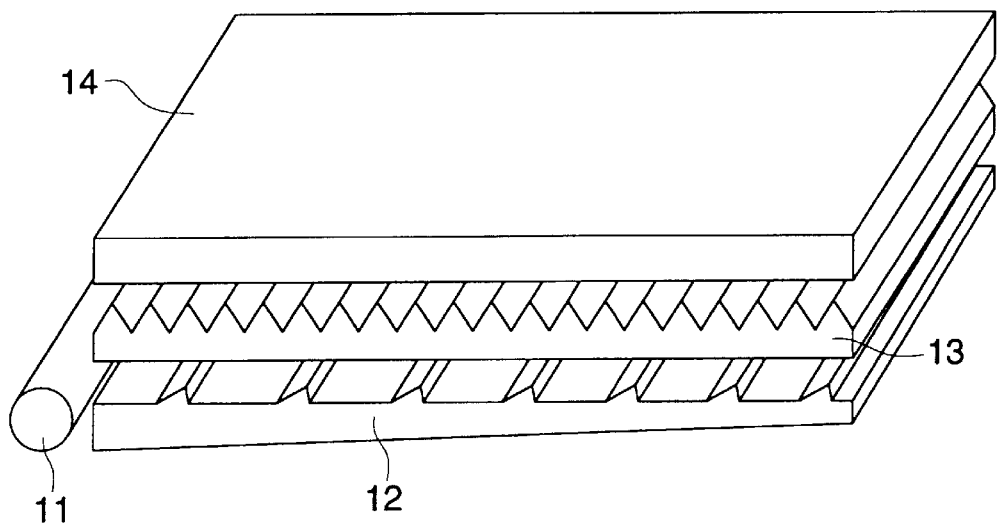
FIGS. 17(a) and 17(b) are diagrams showing an arrangement wherein a prism portion of a light control sheet is arranged so that it faces a liquid crystal display element.
Figure 17:
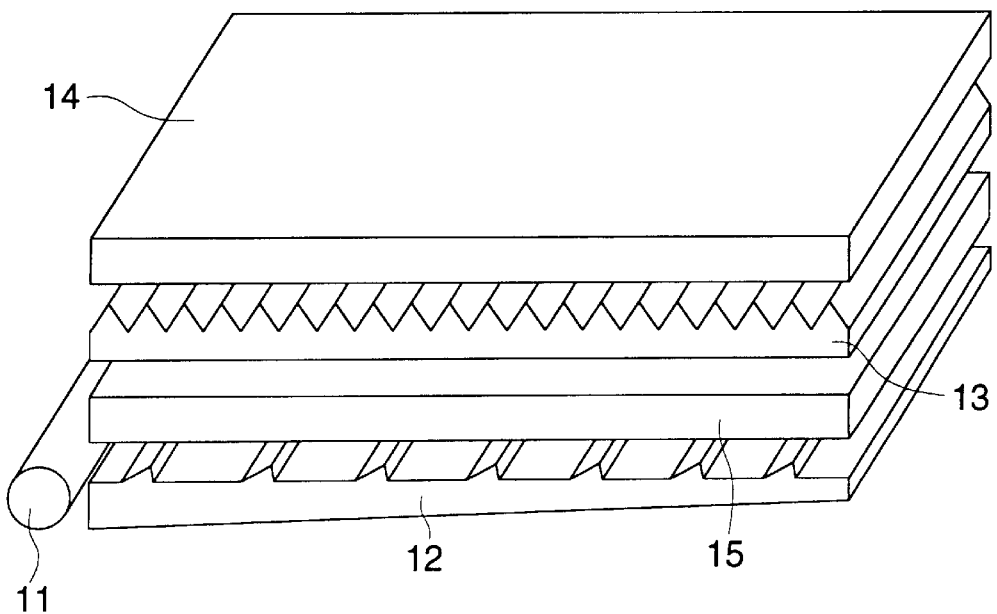

In the example explained above, the prism 13a of the light control sheet 13 faces the light-guiding plate 12. On the contrary, FIGS. 17(a) and 17(b) show examples wherein the prism 13a of the light control sheet 13 faces liquid crystal display element 14. Namely, in FIG. 17(a), the prism 13a faces the liquid crystal display element 14 and diffusion sheet 15 is not provided. In the example in FIG. 17(b), the prism 13a faces the liquid crystal display element 14 and diffusion sheet 15 is provided.

Figure 18:
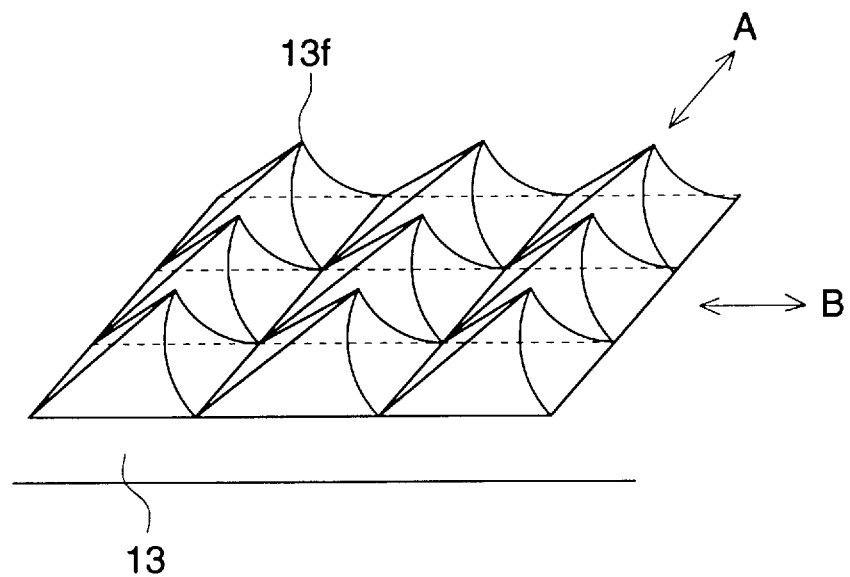
FIGS. 18(a) and 18(b) are diagrams showing other examples wherein a boundary surface on a prism portion of a light control sheet is made to be aspheric.
Figure 18:
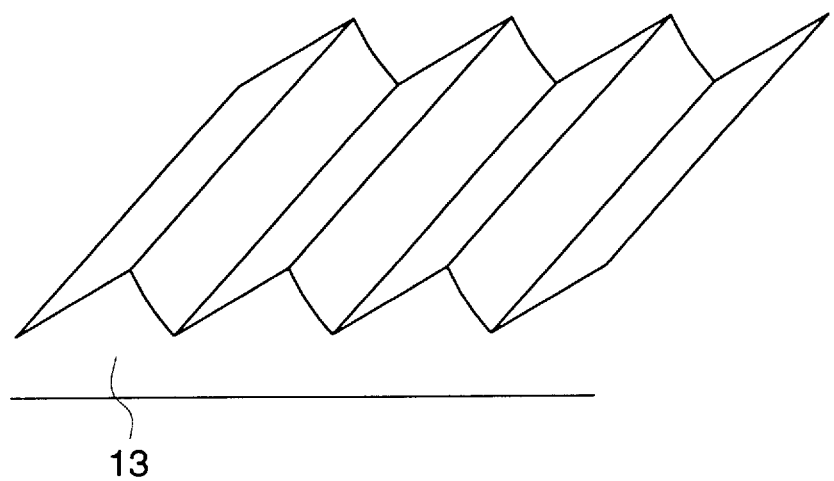
Figure 19:
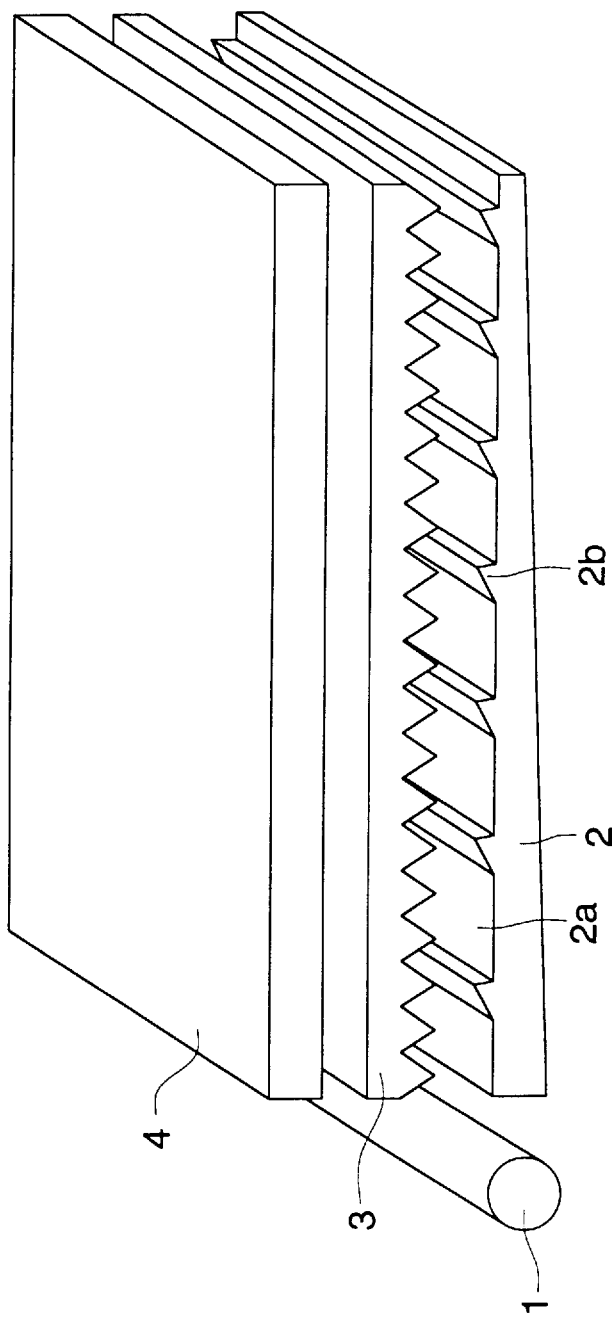
FIG. 19 is a diagram showing a liquid crystal display device employing a conventional light control sheet.
Figure 20:
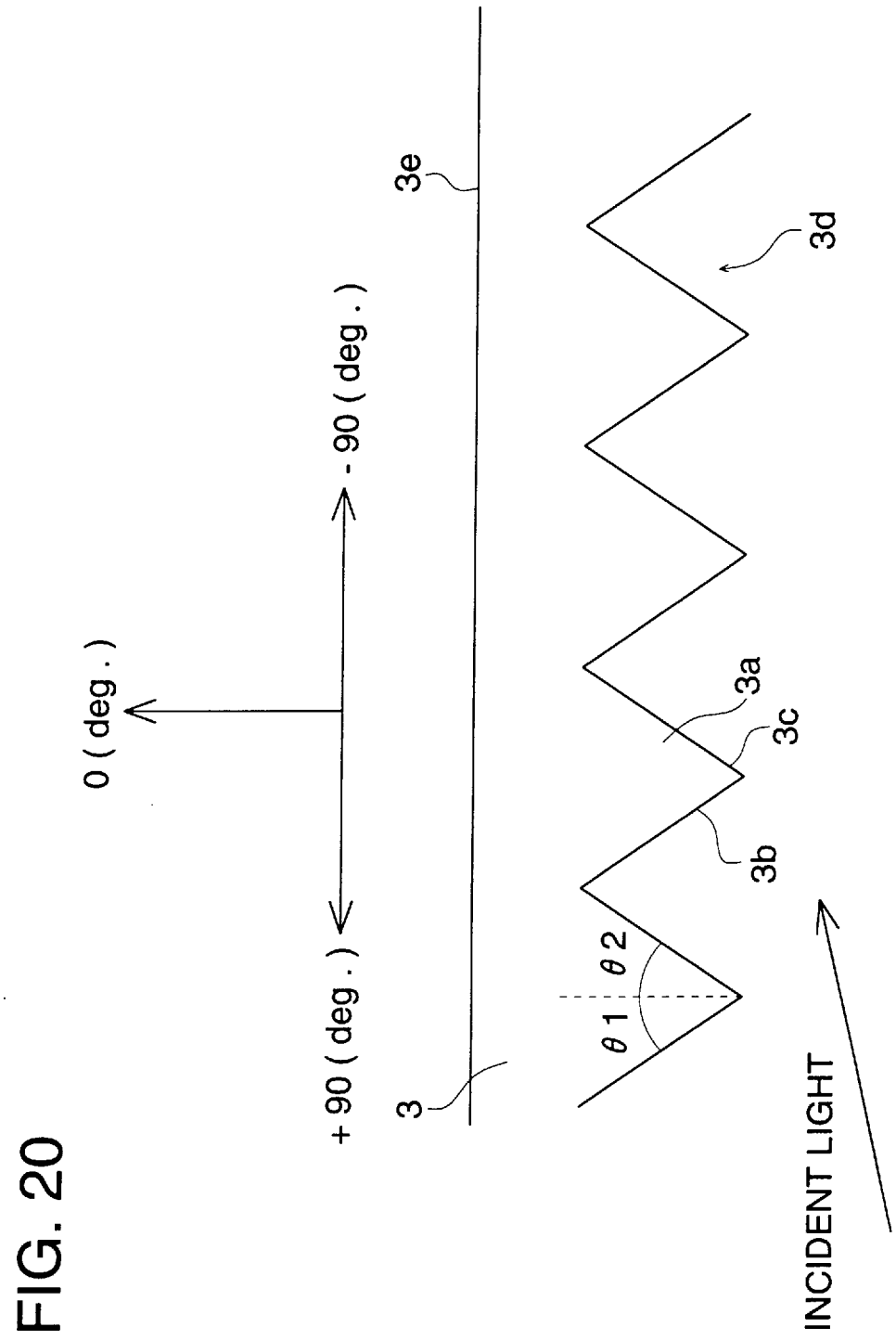
FIG. 20 is an enlarged section of the light control sheet shown in FIG. 19.

Further, FIGS. 18(a) and 18(b) show other examples wherein at least one of boundary surfaces 13b and 13c of the prism 13a on light control sheet 13 is made to be nonplanar. Namely, in the example in FIG. 18(a), projection 13f is formed in an embossed shape, a surface on one side of a prism is formed to be a plane surface and a surface on the other side of a prism is formed to be a curved surface both on the section of the prism perpendicular to generatrix A, and a section of the prism perpendicular to generatrix B is an equilateral triangle in shape. That is, the prism 13a is structured by a convex prism group. In the example in FIG. 18 (b) a surface on one side of a prism is formed to be a plane surface and a surface on the other side of the prism is formed to be a combination of a plane surface and a curved surface both on the section of the prism perpendicular to generatrices.

Due to a light control sheet of the invention having on at least one side of the sheet a plurality of prisms formed in a manner that generatrices forming the prisms are in parallel each other so that an incident light entering the light control sheet through the prism-formation side of the sheet emerges out of the other side thereof, wherein each of the aforesaid prisms has, when viewed in the direction that is in parallel with the generatrices, two boundary surfaces which meet at a vertex of the prism and are asymmetric about a straight line which passes through the vertex of the prism and is perpendicular to the sheet surface, and at least one of the two boundary surfaces is nonplanar, it is possible to change a graphical shape of luminance of light emerging from a light control sheet by changing the shape of the nonplanar surface and thereby it is possible to control a maximum luminance, a half-value degree and a side lobe light so that they may meet the specifications of a liquid crystal display device.

Further, when a shape of the section of the prism is changed in a manner that a light intensity peak of the light entering the sheet is slanted against the sheet surface, and the light emerging from the sheet passes through the center portion of the sheet and crosses a plane that is in parallel with generatrices of the prism and is perpendicular to the sheet surface, there is no luminance unevenness when viewed from an observer.

Due to a surface light source unit of the invention composed of a light source, a light-guiding plate that guides light emitted from the light source and makes it to emerge in the prescribed direction, and a light control sheet in which a plurality of prisms are formed on at least one side of the sheet in a manner that generatrices forming the prisms are in parallel each other and light from the light-guiding plate is made to enter one side of the sheet and to emerge from the other side of the sheet, wherein each of the aforesaid prisms of the light control sheet has, when viewed in the direction that is in parallel with the generatrices, two boundary surfaces which meet at a vertex of the prism and are asymmetric about a straight line which passes through the vertex of the prism and is perpendicular to the sheet surface, and at least one of the two boundary surfaces is nonplanar, it is possible to change a graphical shape of luminance of light emerging from a light control sheet by changing the shape of the nonplanar surface and thereby it is possible to control a maximum luminance, a half-value degree and a side lobe light so that they may meet the specifications of a liquid crystal display device.

Due to a liquid crystal display device of the invention composed of a light source, a light-guiding plate that guides light coming from the light source and makes it to emerge in the prescribed direction, a light control sheet in which a plurality of prisms are formed on at least one side of the sheet in a manner that generatrices forming the prisms are in parallel each other and light from the light-guiding plate is made to enter one side of the sheet and to emerge from the other side of the sheet, and liquid crystal display elements provided at both sides on the other side of the light control sheet, wherein each of the aforesaid prisms of the light control sheet has, when viewed in the direction that is in parallel with the generatrices, two boundary surfaces which meet at a vertex of the prism and are asymmetric about a straight line which passes through the vertex of the prism and is perpendicular to the sheet surface, and at least one of the two boundary surfaces is nonplanar, it is possible to control a maximum luminance, a half-value and a side lobe light by changing a graphical shape of luminance of light emerging from the light control sheet.

Further, a diffusion sheet provided between the light-guiding plate and the light control sheet both mentioned above makes an image plane of a liquid crystal display element to be illuminated uniformly in terms of luminance.

It is further possible to prevent a moire caused by a light-guiding plate and a light control sheet, by providing the light control sheet on the surface of the liquid crystal display element that is opposite to its surface facing the light-guiding plate.

What is claimed is:

1. A surface light source device comprising:
   a light source;
   a light-guiding plate for emitting a light incident from the light source to a predetermined direction, the light-guiding plate having a plurality of prism portions and a plurality of plane portions on a surface thereof;
   a light control sheet for receiving the light emitted from the light-guiding plate on one surface thereof and for emitting the received light from the other surface thereof, the light control sheet comprising:
   a first surface;
   a second surface opposite the first surface; and
   a plurality of prisms provided at least on one of the first and second surfaces, the plurality of prisms having parallel generatrices,
   wherein each of the plurality of prisms has two side surfaces formed one on each side of a plane perpendicular to the light control sheet, the two side surfaces are asymmetric with the plane, and at least one of the two side surfaces is nonplanar.

2. The surface light source device of claim 1, wherein the nonplanar surface is a curved surface that is convex.

3. The surface light source device of claim 2, wherein the other side surface of the two side surfaces is plane.

4. The surface light source device of claim 1, wherein the nonplanar surface is a curved surface that is concave.

5. The surface light source device of claim 1, wherein the nonplanar surface is formed by a combination of a plane surface and a curved surface.

6. The surface light source device of claim 2, wherein the plurality of prisms each satisfies the following condition, $$2.79 \leq |r_1/p| \leq 5.88$$

where $r_1$ represents a radius (mm) of curvature of the convex curved surface, and p represents a pitch (mm) of each of the plurality of prisms.

7. The surface light source device of claim 4, wherein the plurality of prisms each satisfies the following condition, $$4.40 \leq |r_1/p| \leq 41.36$$

where $r_2$ represents a radius (mm) of curvature of the concave curved surface, and p represents a pitch (mm) of each of the plurality of prisms.

8. A light control sheet for receiving a light incident on one surface thereof and for emitting the received light from the other surface thereof, the light control sheet comprising:
   a first surface;
   a second surface opposite the first surface;
   a plurality of prisms provided at least one of the first and second surfaces, the prisms having parallel generatrices,
   wherein each of the plurality of prisms has two side surfaces formed one on each side of a plane perpendicular to the light control sheet, the two side surfaces are asymmetric with the plane, and at least one of the two side surfaces is a curved surface that is convex,
   and wherein the plurality of prisms each satisfies the following condition, $$2.79 \leq |r_1/p| \leq 5.88$$

where $r_1$ represents a radius (mm) of curvature of the convex curved surface and p represents a pitch (mm) of each of the plurality of prisms.

9. The light control sheet of claim 8, wherein the other side surface of the two surfaces is planar.

10. The light control sheet of claim 8, wherein the plurality of prisms are provided substantially in parallel to each other with respect to a direction of the generatrices.

11. The light control sheet of claim 10, wherein a sectional shape on a plane of each of the plurality of prisms including the generatrix and being perpendicular to the light control sheet, does not change with respect to the direction of generatrices.

12. The light control sheet of claim 8, wherein the plurality of prisms are disposed along the direction of the generatrices.

13. The light control sheet of claim 8, wherein each of the plurality of prisms includes a convex prism group.

14. A light control sheet for receiving a light incident on one surface thereof and for emitting the received light from the other surface thereof, the light control sheet comprising:

a first surface;

a second surface opposite the first surface;

a plurality of prisms provided at least one of the first and second surfaces, the prisms having parallel generatrices, wherein each of the plurality of prisms has two side surfaces formed one on each side of a plane perpendicular to the light control sheet, the two side surfaces are asymmetric with the plane, and at least one of the two side surfaces is a curved surface that is concave, and wherein the plurality of prisms each satisfies the following condition, $$4.40 \leq |r_2/p| \leq 41.36$$

where $r_2$ represents a radius (mm) of curvature of the concave curved surface and p represents a pitch (mm) of each of the plurality of prisms.

15. The light control sheet of claim 14, wherein the other side surface of the two side surfaces is planar.

16. The light control sheet of claim 14, wherein the plurality of prisms are provided substantially in parallel to each other with respect to a direction of the generatrices.

17. The light control sheet of claim 16, wherein a sectional shape of a plane of each of the plurality of prisms including the generatrix and being perpendicular to the light control sheet, does not change with respect to the direction of generatrices.

18. The light control sheet of claim 14, wherein the plurality of prisms are disposed along a direction of the generatrices.

19. The light control sheet of claim 14, wherein each of the plurality of prisms includes a convex prism group.

* * * * *